(12) United States Patent
Shukhmin

(10) Patent No.: US 8,727,308 B2
(45) Date of Patent: May 20, 2014

(54) ADJUSTABLE ELECTROMAGNETIC FLUID FLOW CONTROL VALVE

(75) Inventor: Konstantin Shukhmin, Tauranga (NZ)

(73) Assignee: Konstantin Shukhmin, Tauranga (NZ)

( * ) Notice: Subject to any disclaimer, the term of this patent is extended or adjusted under 35 U.S.C. 154(b) by 158 days.

(21) Appl. No.: 13/138,917

(22) PCT Filed: Apr. 22, 2010

(86) PCT No.: PCT/NZ2010/000077
§ 371 (c)(1),
(2), (4) Date: Oct. 24, 2011

(87) PCT Pub. No.: WO2010/128869
PCT Pub. Date: Nov. 11, 2010

(65) Prior Publication Data
US 2012/0085954 A1 Apr. 12, 2012

(30) Foreign Application Priority Data

May 4, 2009 (NZ) ........................................ 576688

(51) Int. Cl.
*F16K 31/02* (2006.01)
(52) U.S. Cl.
USPC ............. 251/129.21; 251/129.16; 137/625.28
(58) Field of Classification Search
USPC .......................... 251/129.16, 129.18, 129.21;
137/625.28; 623/2.2, 2.22, 2.25, 2.27,
623/2.28, 2.31, 2.32, 2.34
See application file for complete search history.

(56) References Cited

U.S. PATENT DOCUMENTS

| 3,120,943 | A | * | 2/1964 | Doneian | 251/129.21 |
| 4,564,046 | A | * | 1/1986 | Lungu | 137/625.65 |
| 4,690,371 | A | * | 9/1987 | Bosley et al. | 251/65 |
| 4,905,962 | A | * | 3/1990 | Iljin | 251/129.16 |
| 4,969,629 | A | * | 11/1990 | Athanassiu | 251/331 |
| 5,503,185 | A | * | 4/1996 | Krause | 137/625.65 |
| 5,992,461 | A | * | 11/1999 | Gilmore et al. | 137/625.65 |
| 6,000,417 | A | * | 12/1999 | Jacobs | 137/2 |
| 6,068,010 | A | * | 5/2000 | Reinicke | 137/1 |

* cited by examiner

*Primary Examiner* — Eric Keasel
*Assistant Examiner* — Matthew W Jellett
(74) *Attorney, Agent, or Firm* — Konstantin Shukhmin

(57) ABSTRACT

An adjustable electromagnetic fluid flow control valve includes: a tubular member of non-magnetizable material. One end of the tubular member is forming an inlet and serves as the main entry port for: gases or other fluids entering the valve. The opposite end of the tubular member is forming an outlet The valve includes at least one annularly configured electromagnetic coil which is surrounded from outside and partially inside by a core preferably built from ferrous laminations. The coil is connected to a power supply and can be energized by the power supply under control of a controller: A disk occluder of a magnetic material has diameter corresponding to the internal diameter of the tubular member. The occluder is disposed Within the tubular member and occludes the fluid flow when is positioned perpendicular to the longitudinal axis of the tubular member. The occluder rests on a supporting non-magnetic-member with at least one passageway for fluid flow. The occluder is pressed against the supporting member by a spring. All spring-loaded members of the valve are locked In place between two inner locking members rigidly mounted within the tubular member. The magnetic torque, exerting influence on the occluder increases or decreases With changes in the electric power to the coil and this changes the cross-sectional area of the flow pass.

2 Claims, 42 Drawing Sheets

ADJUSTABLE ELECTROMAGNETIC FLUID FLOW CONTROL VALVE

TECHNICAL FIELD

The invention relates generally to variable flow valves for fluids, and more particularly to electrically controlled variable flow valves for fluids.

BACKGROUND ART

There is a long-standing need for valve devices which can be used to produce a variable fluid flow. Varying the flow through valves is usually achieved by varying the available cross-sectional area presented to the flow. Devices utilizing a disk occluder disposed in a fluid flow passageway, which co-operates with electromagnetic coil in order to open or close the passageway permitting or restricting fluid flow through the passageway are known in the art. A typical example of this type of valve is disclosed in U.S. Pat. No. 5,135,538, an electromagnetic control mechanism forces the disk occluder to remain closed when energised until a predetermined net pressure is reached against the disk occluder. Where the electromagnetic control mechanism is either selectively deenergized or the force on the occluder disk is greater than the holding force of the electromagnetic control mechanism, the disk occluder is released from the closed position to pivot on the fulcrum in response to fluid pressure.

A difficulty with this device resides in the difficulty of accurately controlling the position of the occluder disk, and achieving a graduated flow variation profile, particularly at the low flow rate end of the control and also the fact that the valve is opened when deenergized.

An example of another device, wherein a size of the cross-sectional area exposed to fluid flow is subject to magnetic flux, is disclosed in U.S. Pat. No. 3,970,112. The power to a coil is altered in order to alter an accumulation of small iron particles which are mixed with a controlled fluid to the inner wall of tubular member in a location near the spaced end surfaces and thereby restricts or allows fluid flow through the tubular member.

A main disadvantage of this device is a constant presence of iron particles in a controlled fluid which makes its use possible only in close-circuit systems and with fluids of particular types of chemical and physical properties.

DISCLOSURE OF INVENTION

It is an object of the present invention to provide a variable flow valve that goes some way towards overcoming the above disadvantages or which will at least provide the public with a useful choice.

Accordingly the present invention provides a fluid metering valve including a housing having an inlet and an outlet ports. A fluid flow path exists between the inlet port and the outlet port, and a valve member is located in the fluid flow path. The valve member consists of at least one occluder which has a closed position when the occluder occludes fluid flow through the passageway and variable open positions when the occluder permits fluid flow through the passageway according to the position of the occluder.

These and other advantages and features of the present invention will be apparent from the detailed description and the accompanying drawings.

BRIEF DESCRIPTION OF DRAWINGS

The accompanying drawings incorporated in and forming a part of the specification, illustrate several aspects of the present invention and together with the description serve to explain the principles of the invention. In the drawings.

DETAILED DESCRIPTION OF THE INVENTION

The present invention is applicable generally to the control of fluid flow including, by way of example only, gas cooking appliances such as cook-tops, barbecues and ovens, electronically controlled fluid flow for home and industrial appliances (washing machines, dryers, dishwashers, fire places, air and water heating, air conditioning), hydraulic, pneumatic and transport vehicle fuel systems, medical equipment, water supply, dosing and mixing fluids, etc.

Figure 1:
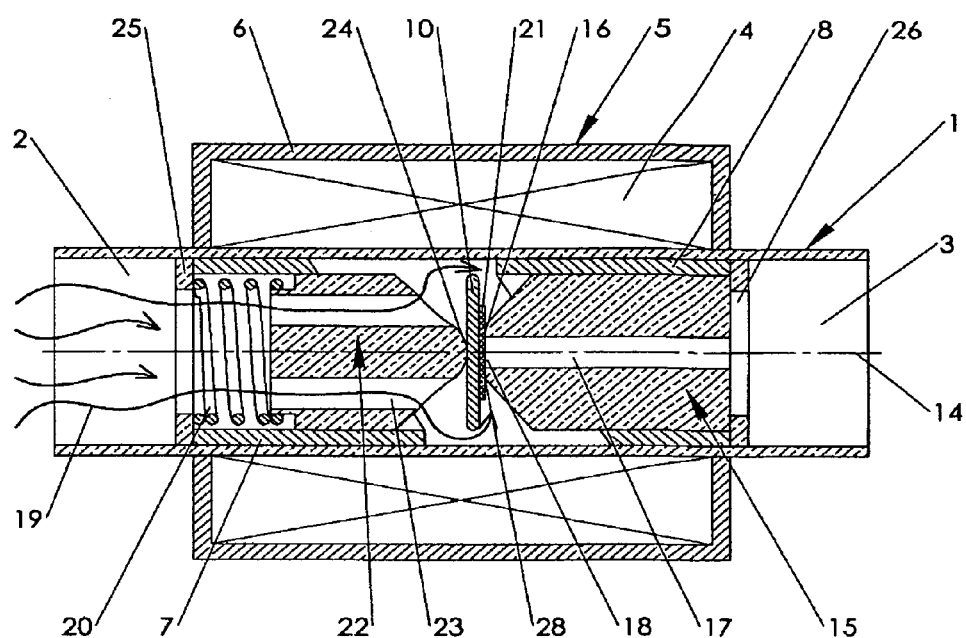
FIG. 1 shows a cross-sectional view of a valve of the present invention in the fully closed position.
Figure 2:
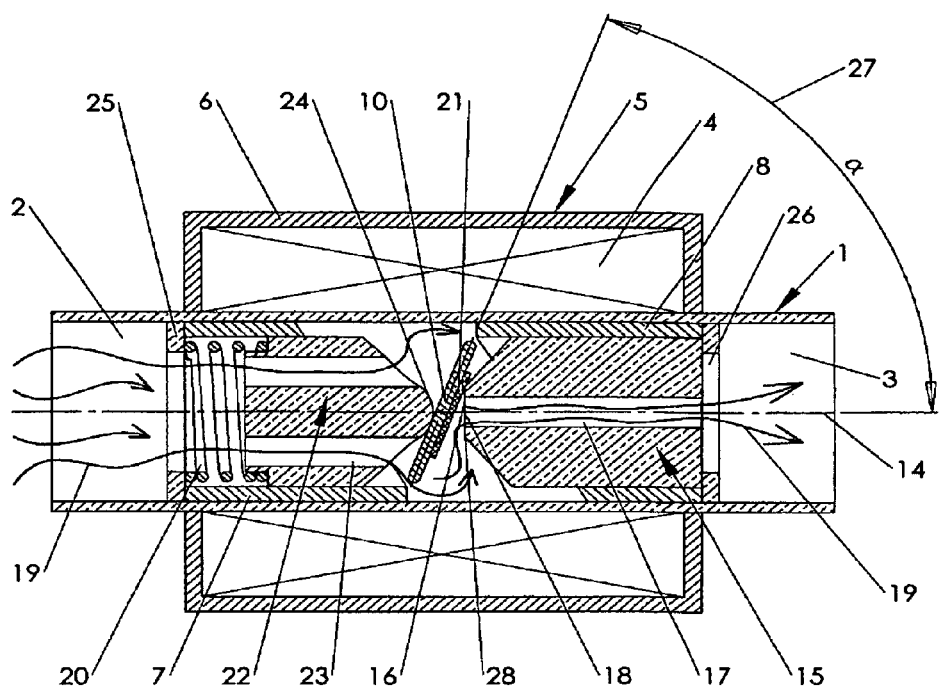
FIG. 2 shows a cross-sectional view of the valve of the FIG. 1 in an opened position.

In the first embodiment illustrated in FIGS. 1 and 2, an adjustable electromagnetic fluid flow control valve (further valve) includes a tubular member 1 of a non-magnetic material, such as copper, aluminum or brass. One end of said tubular member 1 is forming an inlet 2 and serves as the main entry port for gases or other fluids entering the valve. The opposite end of the tubular member 1 is forming an outlet 3. The inlet 2 and the outlet 3 may be fitted with any suitable attachment or connector, for connecting them to a gas or fluid reservoir. It should be noted that the valve can be used in any orientation and direction of the flow. However, for the purpose of this description, the inlet 2 will be described as at the left of the valve, with the outlet 3 at the right of the tubular member 1.

The valve includes at least one an annularly configured electromagnetic coil 4 which is surrounded from outside and partially inside by a core 5 preferably built from ferrous laminations. The outer part of the core 5 is communally referred to as a cage 6. The inner part of the core 5 consists of at least two bushes (left 7 and right 8) surrounding the tubular member 1, mutually spaced, forming an gap 9, fit flush with the corresponding surfaces of the cage 6 and communally referred to as poles. The coil 4 may have leads or terminals (not shown) that are connected to a power supply and can be energised by the power supply under control of a controller.

The valve also includes an occluder 10 of a magnetic material and in a shape corresponding to the internal shape of the cross-section of the tubular member 1. The occluder 10 is disposed within the tubular member 1, between the poles 7 and 8 and within effective area of magnetic flux generated by the coil 4. The occluder 10 rests on a supporting member 13, more specifically on its flat tip 14. In the preferred embodiment the supporting member 13 of a non-magnetic material and has at least one passageway 15 allowing fluid flow through. The occluder 10 is pressed against the flat tip 14 of the supporting member 13 by a biasing means 16, such as one or several springs. To lock in piece such spring-loaded members of the valve as occluder 10, supporting member 13 and the spring 16, the valve has two inner locking members (left 17 and right 18) rigidly mounted within the tubular member 1.

Figure 3:
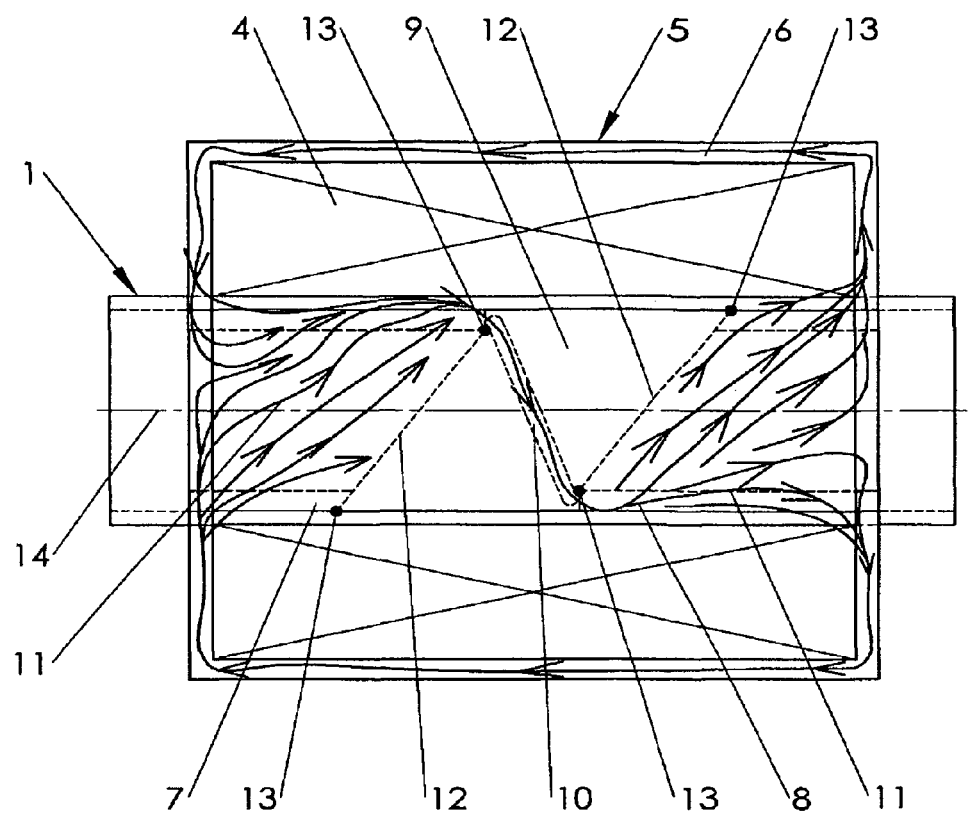
FIG. 3 shows a front view of the valve's occluder within the tubular member and in an opened position.
Figure 4:
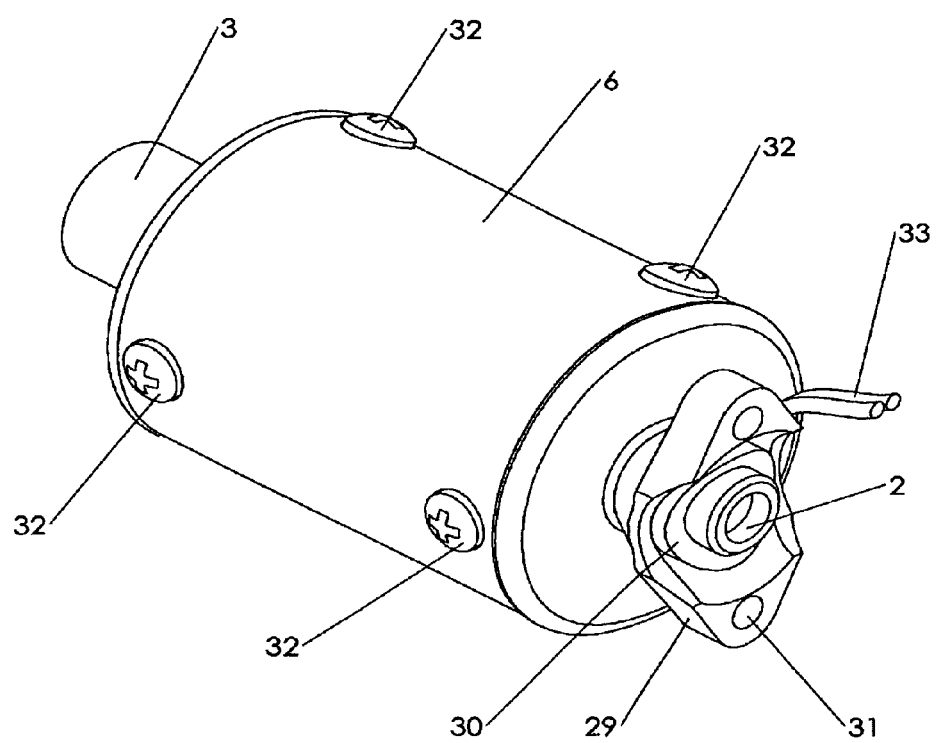
FIG. 4-7 show a front view of different variants of the supporting member within the tubular member.
Figure 5:
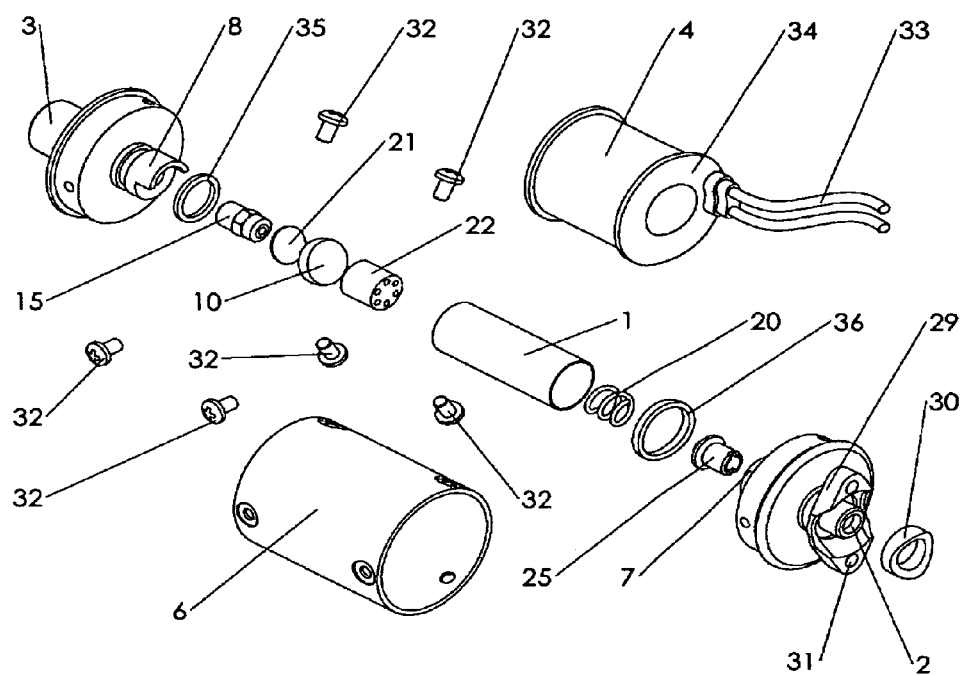
Figure 6:
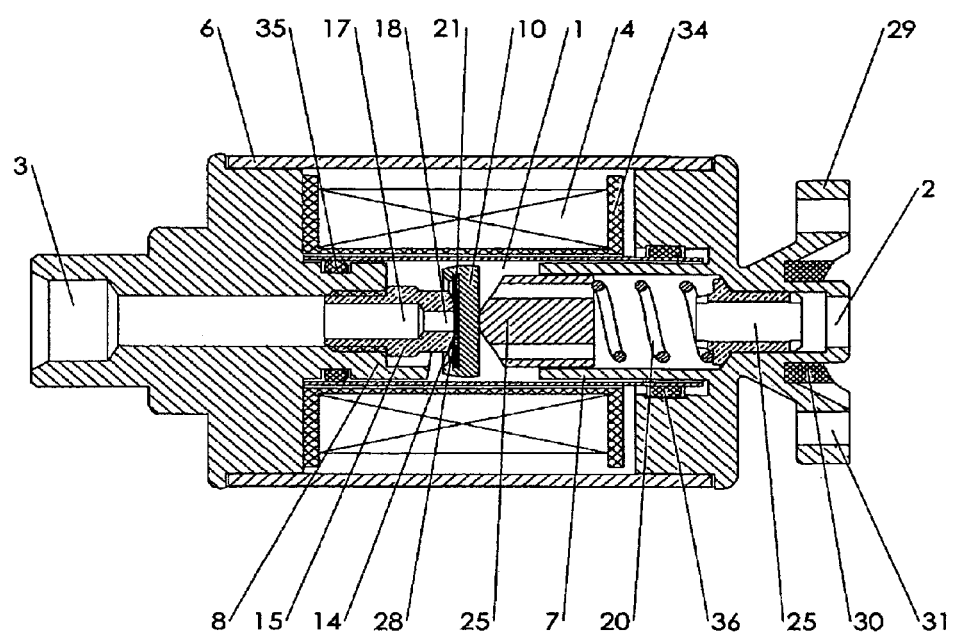
Figure 7:
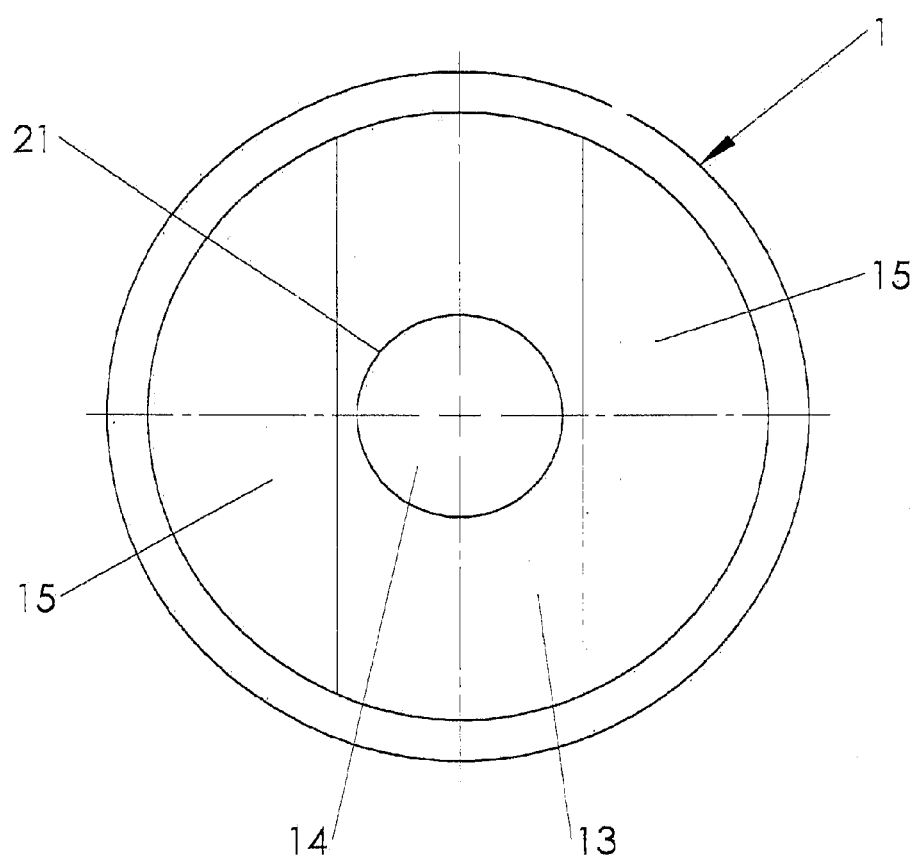

In the closed position (FIG. 1) the occluder 10 is positioned perpendicular to the longitudinal axis 12 of the tubular member 1 and occludes the fluid flow 11. In an open position (FIG. 2), when the occluder 10 permits fluid flow from the inlet 2 to the outlet 3, the coil 4 is energised and induces magnetic flux 19 in the magnetic circuit of the valve, comprised of the core 5 and the occluder 10, and creates a magnetic torque which turns the occluder 10 to an angle ($\alpha$) 20 relatively to the longitudinal axis 12 of the tubular member 1, the angle depends on the value of the magnetic flux 19 and, consequently, on the electric current applied to the coil 4. To enable the occluder 10 to be turned, it pivots on the edge 21 of the supporting member 13. When the valve is closed the angle $\alpha=90°$; and when the valve is opened: $0°<\alpha<90°$. In the preferred embodiment the cross-sectional area 22 (FIG. 3) opened to the fluid flow by the occluder 10 equals to the cross-sectional area of the occluder multiplied by COS ($\alpha$). The magnetic torque exerting influence on the occluder 10 increases or decreases with changes in the power supplied to the coil 4, which changes the cross-sectional area of the flow pass 22.

FIGS. 4 through 7 show the front view of different embodiments of the supporting member 13 within the tubular member 1. The main differences between these embodiments are number and shape of the passageways 15.

To reduce dissipation 23 (FIG. 2) of the magnetic flux 19 and, consequently, reduce electric power required to operate the coil 4, the bushes 7 and 8 (FIG. 8) have their counter ends truncated to an angle relatively to the longitudinal axis 12 of the tubular member 1 and a value of the angle is more than 0 degrees and less than 90 degrees. This also allows to predetermine the pivoting direction of the occluder 10.

Figure 9:
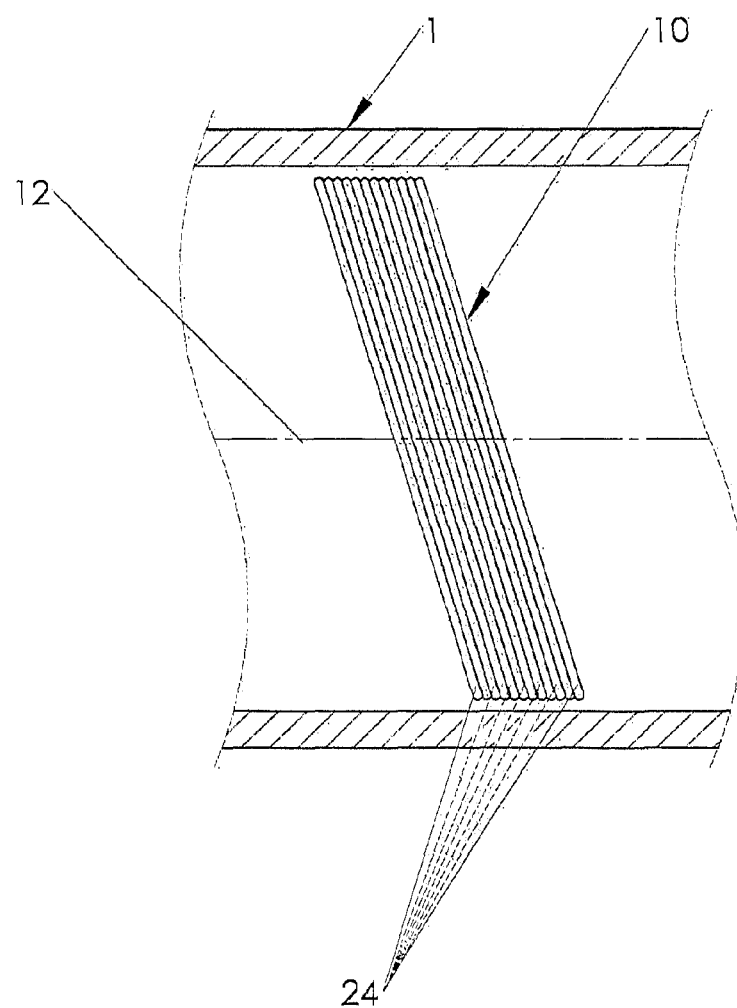
FIG. 9 shows a cross-sectional view of the multiple-unit occluder within the tubular member.

Another way of improving efficiency of the magnetic system is to increase the thickness of the occluder 10. FIG. 9 shows a multiple-unit occluder 10 consisting of several disks 24; this increases the cross-sectional area of the magnetic path and reduces dissipation of the magnetic flux. And also such embodiment of the occluder 10 improves its ability to seal the passageway through the tubular member 1 when the valve is closed.

Figure 10:
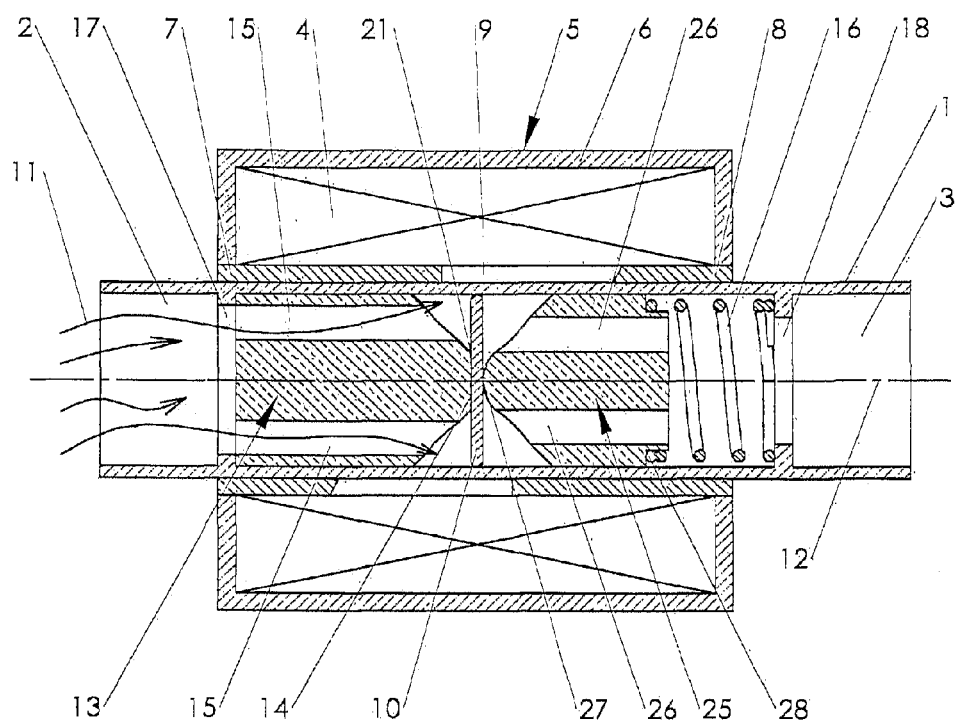
FIG. 10 shows a cross-sectional view of an alternative embodiment of the valve of the present invention in the fully closed position and with an additional supporting member.
Figure 11:
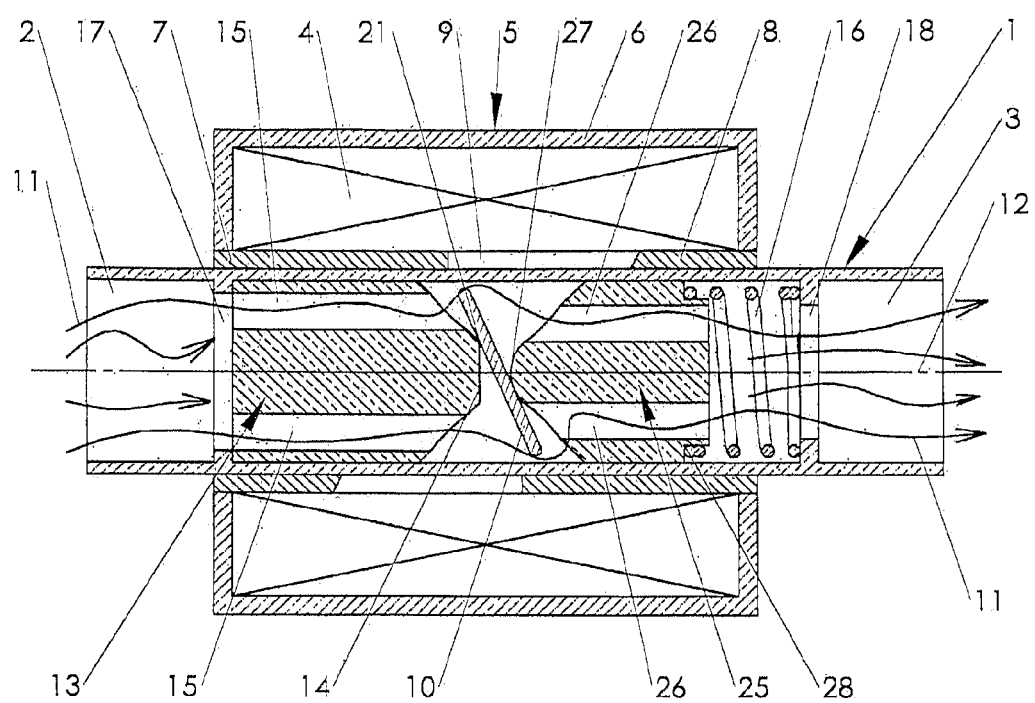
FIG. 11 shows a cross-sectional view of the valve of FIG. 10 in an opened position.

A further embodiment is illustrated in FIGS. 10 and 11. In this embodiment force of the spring 16 is applied to the occluder via an additional supporting non-magnetic member 25 exposed within the tubular member 1. The supporting member 25 has at least one passageway 26 allowing fluid flow through, a tip 27, which surface is tangential to the end surface of the occluder 10, and a seat 28 for the spring 16. This provides smoother pivoting of the occluder and less parts' deterioration. FIG. 10 shows the closed position of the valve and FIG. 11—an opened position.

Figure 12:
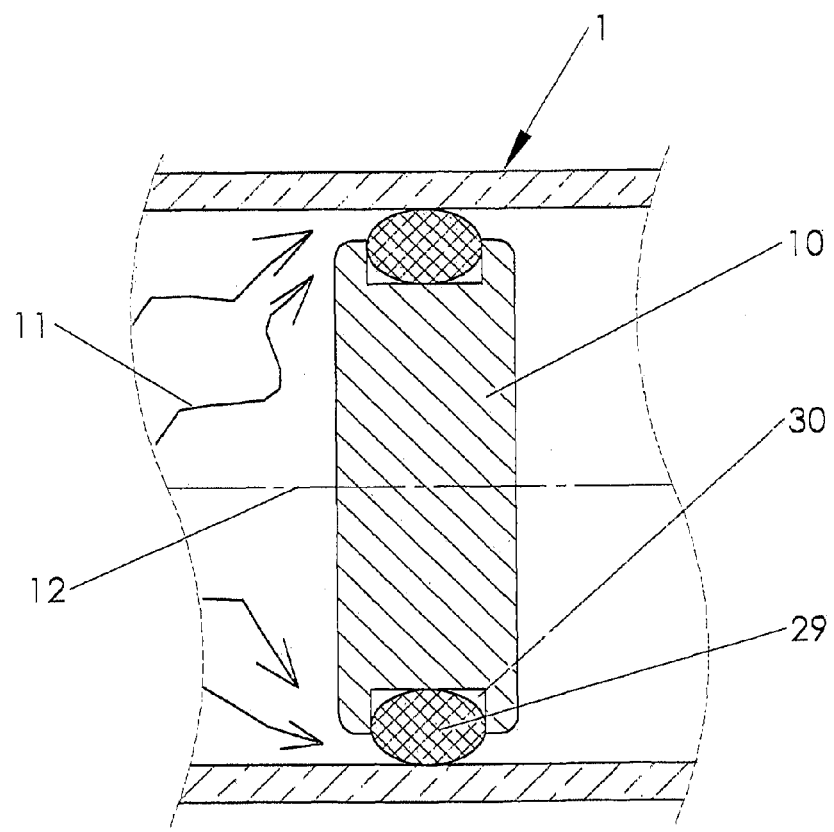
FIG. 12 shows a cross-sectional view of the occluder with a sealing member within the tubular member.

To prevent a bypass leakage between outer surface of the occluder 10 and inner surface of the tubular member 1 when the valve is closed the further embodiment shown in FIG. 12 has a sealing member 29, for example, of a rubber and in a shape of an o-ring. The occluder 10 has a corresponding groove 30 for tight fit of the o-ring. When the valve is closed and the occluder 10 is perpendicular to the longitudinal axis 12 of the tubular member 1 and hermetically blocks the fluid flow from inlet to outlet due to interference between the outer diameter of the o-ring 29 and inner diameter of the tubular member 1.

And conversely, the sealing member 29 can be fitted inside the tubular member 1 around the occluder 10.

Figure 13:
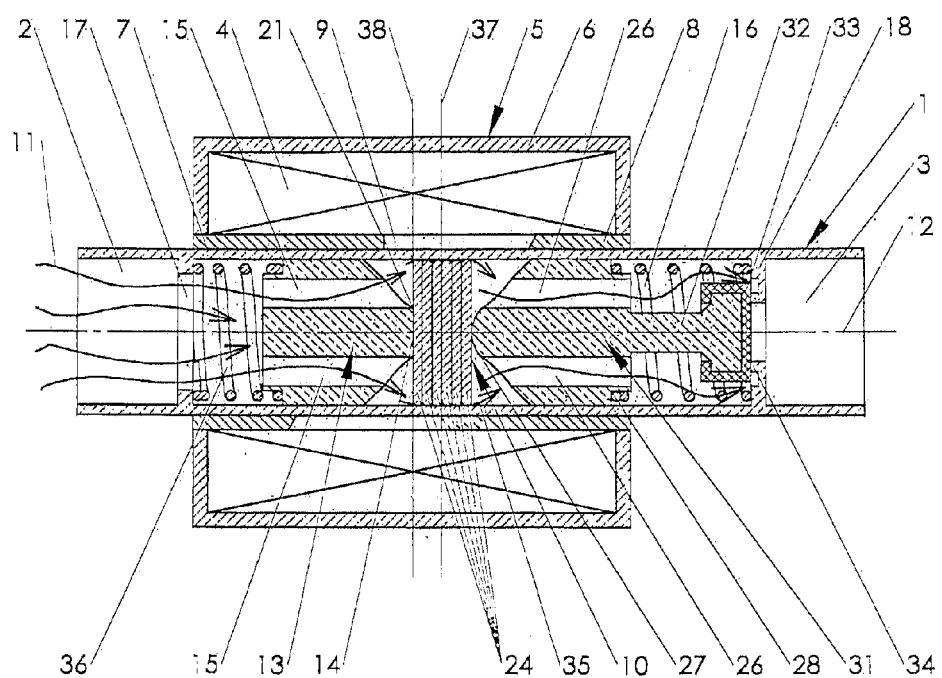
FIG. 13 shows a cross-sectional view of an alternative embodiment of the valve of the present invention in the fully closed position and with an additional supporting member, a sealing member and a spring.
Figure 14:
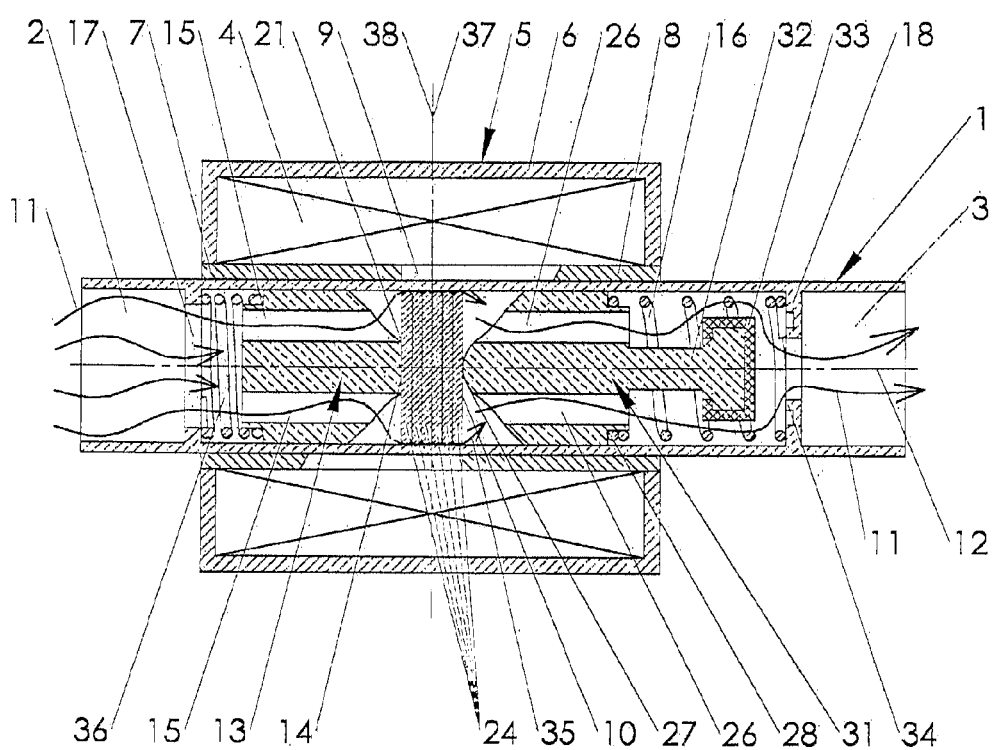
FIG. 14 shows a cross-sectional view of the valve of FIG. 13 in the initial opened position.
Figure 15:
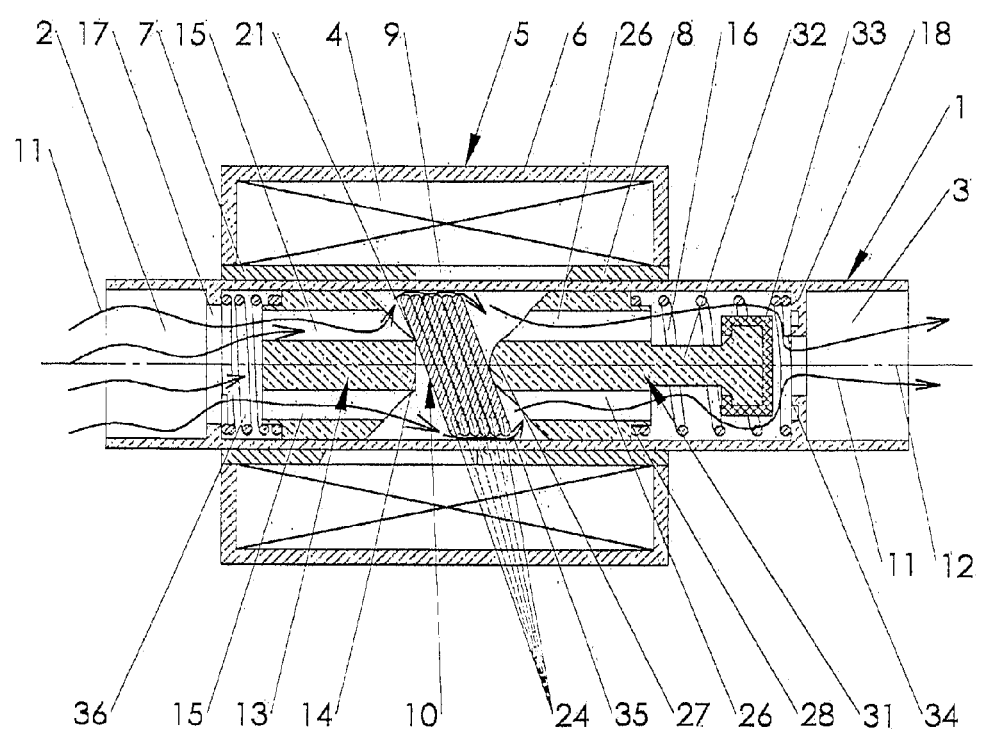
FIG. 15 shows a cross-sectional view of the valve of FIG. 13 in an opened but the initial position.

To combine properties of a variable flow control valve and a shutoff valve in one device, further embodiment of the valve illustrated in FIGS. 13 through 15, instead of the supporting member 25 (FIGS. 10 and 11), the valve has an additional non-magnetic member 31 with the flow passageways 26 and a protrusion 32 acting as a sealing member with a rubber seal 33 fitted onto it and a corresponding seat 34 for the seal 33 adjacent to the outlet 3 to prevent any leakage 35 bypassing the occluder 10 and exiting through the outlet 3 when the valve is closed (FIG. 13). To maintain a sufficient mechanical pressure to the seal 33 this embodiment includes a second biasing means 36, such as spring which modulus of elasticity is greater than the modulus of elasticity of the spring 16. The second spring 36 is inserted between the left locking member 17 adjacent to the inlet 2 and the supporting member 13 and urging the additional member 31 with the seal 33 towards the seat 34. In the closed position the magnetic centre 37 of the occluder 10 is offset from the magnetic centre 38 of the coil 4, formed by the poles 7 and 8, by a distance within which a movement of the occluder 10 and the additional member 31 with the seal 33 is sufficient to open the valve outlet 3 for fluid flow 11. When the coil 4 is energised at least by the threshold voltage (also known as minimum required voltage level), which creates a sufficient magnetic flux (not shown) to attract the occluder 10 closer to the magnetic centre 38 of the coil 4, compressing the spring 36 and allowing the additional member 31 with the protrusion 32 to be pushed left by the spring 16 and to open the outlet 3 (FIG. 14). In case of a presence of a bypass leakage 35 its flow exits through the outlet 3 and serves as a first stage of the valve output.

To enable the valve of preferred embodiment to provide a known amount of fluid flow at the first stage the cross-sectional area of the occluder 10, exposed to fluid flow, when the occluder is perpendicular to the longitudinal axis 12 of the tubular member 1, is smaller than the cross-sectional area of the tubular member 1, around the occluder 10, by a predetermined difference, providing a known bypass leakage 35 as an initial flow output.

With the further increase of the electric current in the coil's winding, electromagnetic force increases and becomes sufficient to turn the occluder 10 and releasing more fluid flow 11 through the valve (FIG. 15) similar to the previously described embodiment in FIG. 2.

Figure 16:
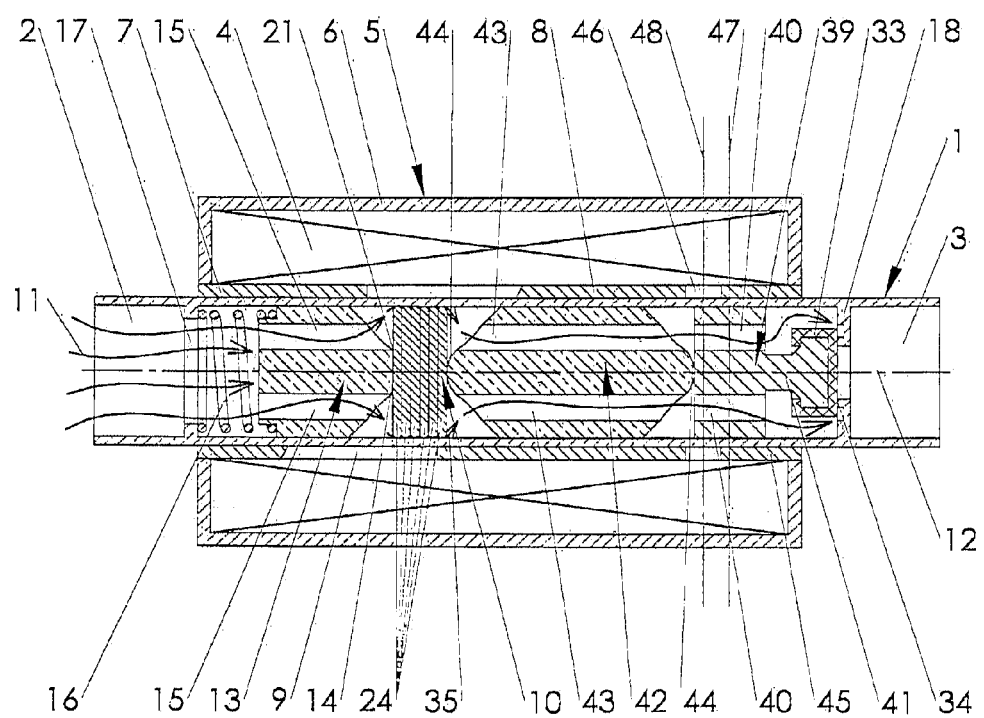
FIG. 16 shows a cross-sectional view of an alternative embodiment of the valve of the present invention in the fully closed position with a magnetic member, a spacer and an additional bush of the core.
Figure 17:
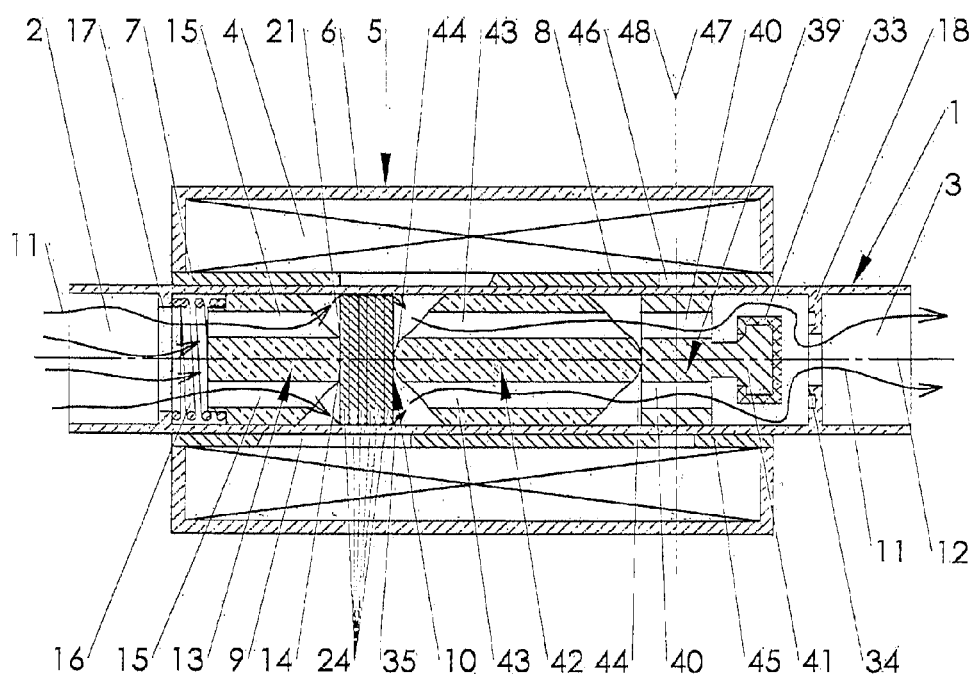
FIG. 17 shows a cross-sectional view of the valve of FIG. 16 in the initial opened position.
Figure 18:
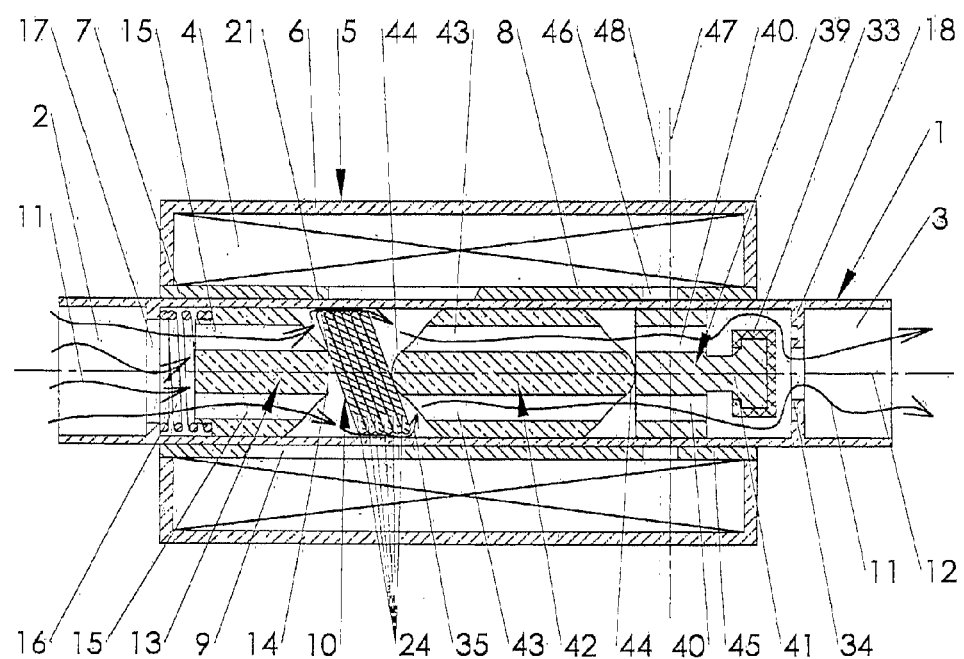
FIG. 18 shows a cross-sectional view of the valve of FIG. 16 in an opened but the initial position.
Figure 19:
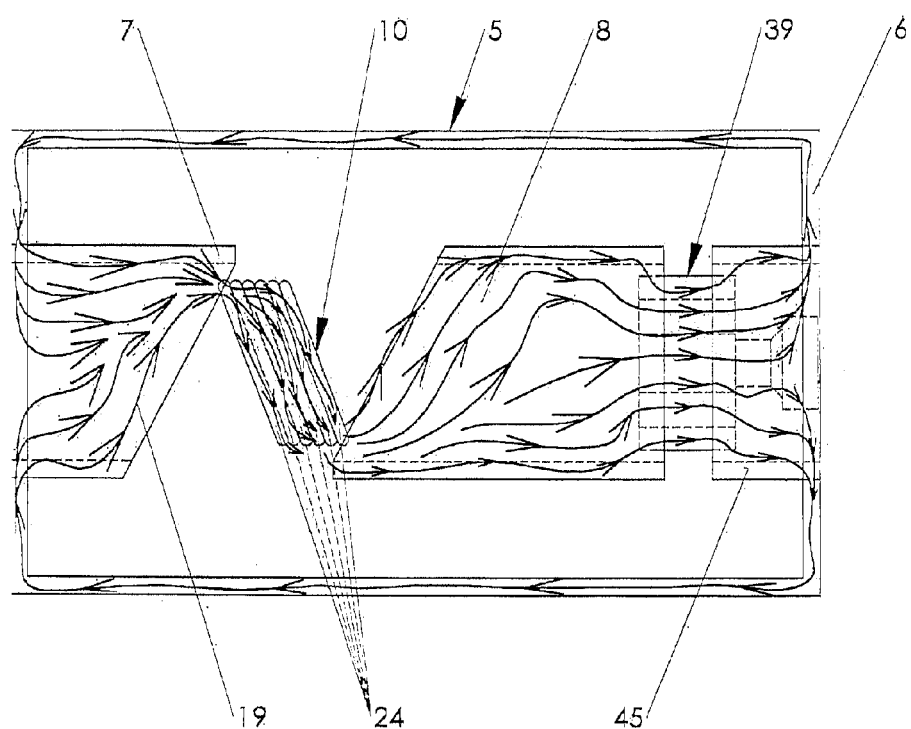
FIG. 19 shows a side view of the magnetic circuit of the valve of FIG. 18 and magnetic flux in the circuit.

To separate the shut-off and flow control functions of the valve between two separate members of the valve its further embodiment, shown in FIGS. 16 through 18, includes a magnetic member 39, located within the tubular member 1 and having the flow passageways 40 and the protrusion 41 acting as a sealing member with the rubber seal 33 fitted onto it and a seat 34 for the seal 33 adjacent to the outlet 3. This prevents any leakage 35 bypassing the occluder 10 through the outlet 3 when the valve is closed (FIG. 16). Preferred embodiment also includes a spacer 42 of a non-magnetic material, located within the tubular member 1 and separating the occluder 10 and the magnetic member 39. The spacer 42 has the flow passageway(s) 43 through its body and both narrowed ends 44. The spring 16 is inserted between left locking member 17 adjacent to the inlet 2 and the supporting member 13 and urging the magnetic member 39 with the seal 33 towards the seat 34. The inner part of the core 5 includes an additional bush 45 surrounding the tubular member 1 and adjacent to the outlet 3 and mutually spaced from the bush 8, creating a gap 46 and fitted flush with the corresponding surfaces of the cage 6. The magnetic center 47 of the magnetic member 39 is offset from the magnetic centre 48, created by the bush 8 and the right bush 45, by a distance within which a movement of the magnetic member 39 with the seal 33 is sufficient to open the valve outlet 3 for the fluid flow 11 and to position the occluder 10 to the middle of the gap 9, created by the bushes 7 and 8. When the coil 4 is energised by at least a threshold voltage, it is when a sufficient magnetic flux (not shown) is created and pulls the magnetic member 39 with the protrusion 41 and the seal 33 towards the centre of the gap 46 and opens the outlet 3 for the fluid flow 11. In case of a presence of a bypass leakage 35, its flow exits through the outlet 3 and serves as a first stage of the valve output (FIG. 17). With the further increase of the electric current in the coil's winding, electromagnetic force increases and becomes sufficient to turn the occluder 10 releasing more fluid flow 11 through the valve (FIG. 18) similar to the previously described embodiments in FIGS. 2 and 15. And FIG. 19 illustrates a path of the magnetic flux 19 through the core 5, occluder 10 and the magnetic member 39 of this embodiment when the coil 4 is energized sufficiently to open the valve.

Figure 20:
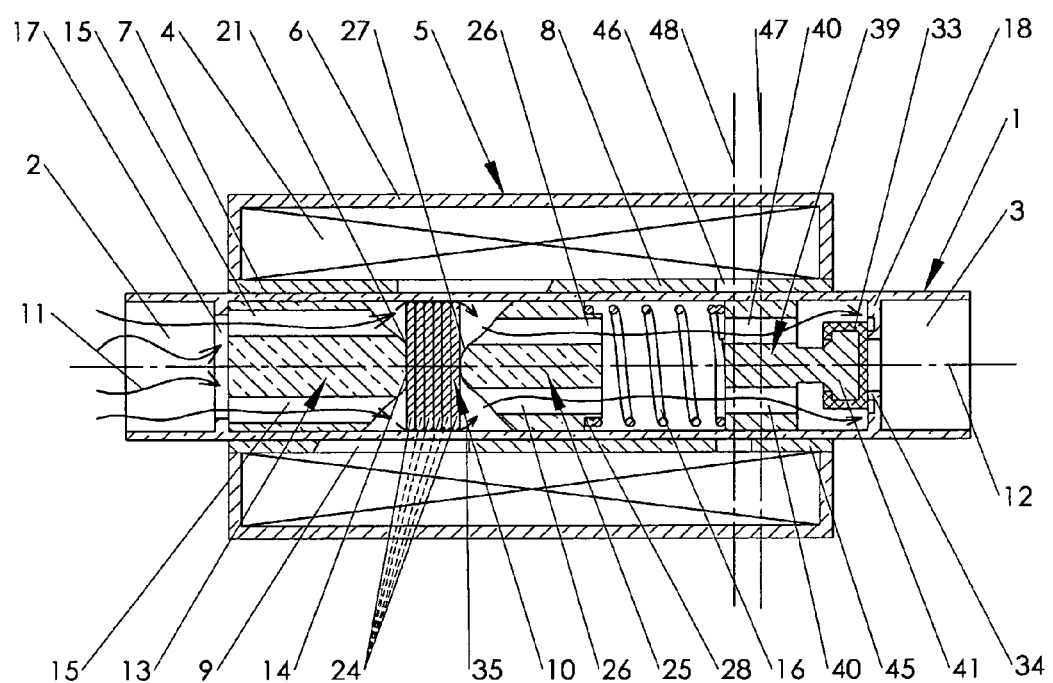
FIG. 20 shows a cross-sectional view of an alternative embodiment of the valve of the present invention in the fully closed position and with transposed internal members of the valve.
Figure 21:
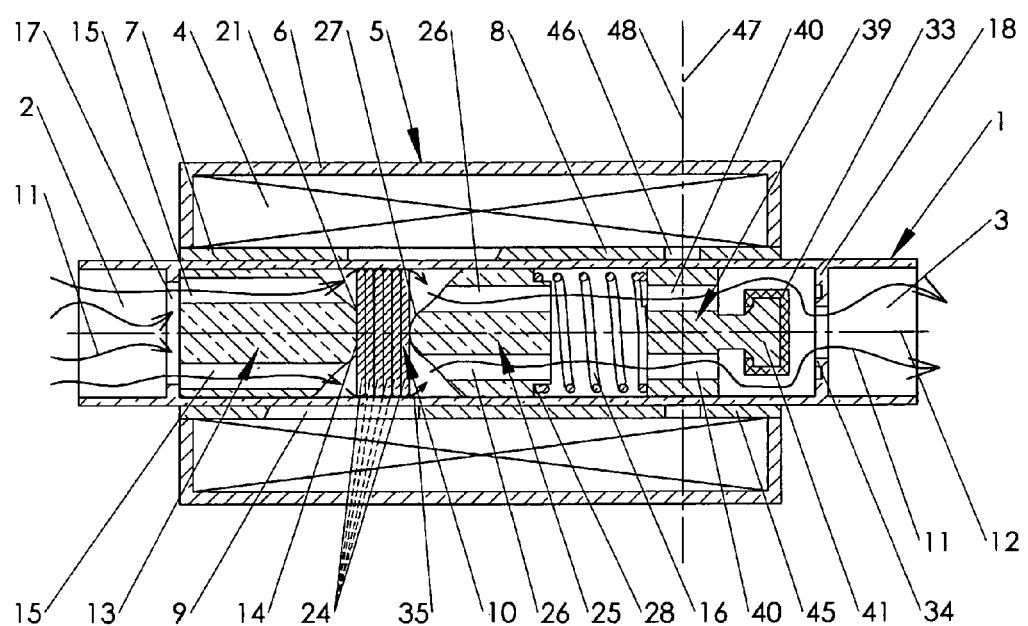
FIG. 21 shows a cross-sectional view of the valve of FIG. 20 in the initial opened position.
Figure 22:
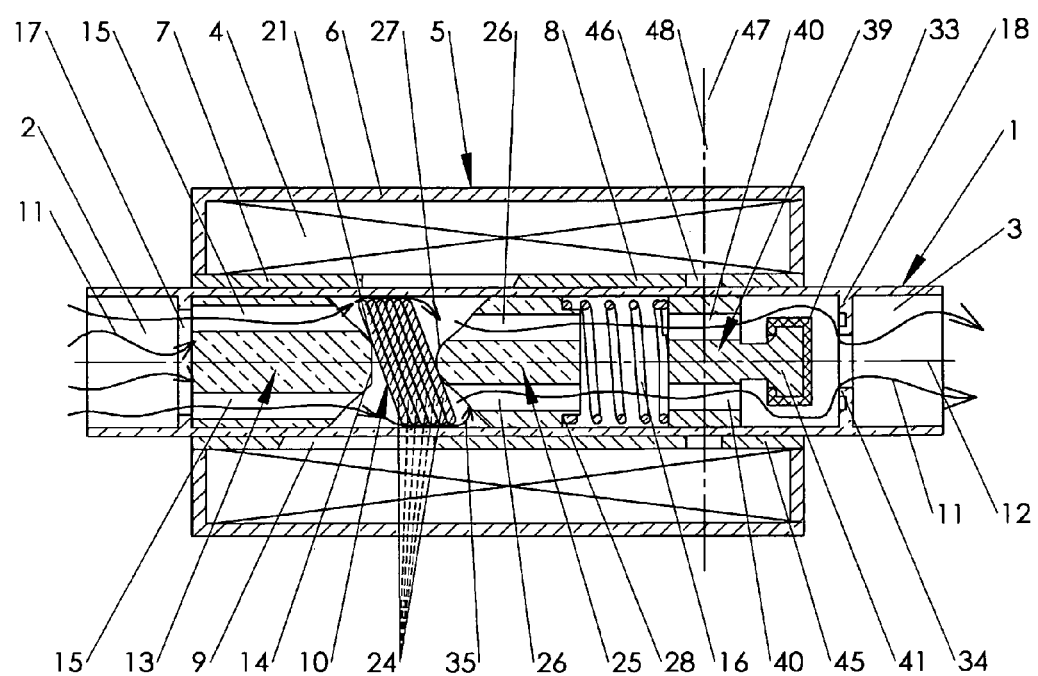
FIG. 22 shows a cross-sectional view of the valve of FIG. 20 in an opened but the initial position.

Similar, to the described above, embodiment of the valve is illustrated in FIGS. 20 through 22 with the difference to the previous embodiment (FIGS. 17 through 19) that it has the nonmagnetic supporting member 25 instead of the non-magnetic spacer 42 and only one spring 16 is inserted between the spacer 25 and the magnetic member 39. This arrangement of the internal parts of the valve (assembled inside the tubular member 1) reduces the number of moving parts of the valve and gives benefits associated with this, such as reduction of parts' deterioration and power to operate the valve. FIG. 20 illustrates the closed valve when the coil 4 is not energized. In FIG. 21—the coil 4 is energised by the threshold voltage which is just sufficient to pull the magnetic member 39 and the seal 33 to the left from the outlet 3 and open an initial stage of the fluid flow 11 bypassing (35) the occluder 10. FIG. 22 illustrates an embodiment wherein strength of the magnetic flux (not shown), generated by the coil 4, is sufficient to turn the occluder 10 to an angle and increase fluid flow 11 through the valve.

Figure 23:
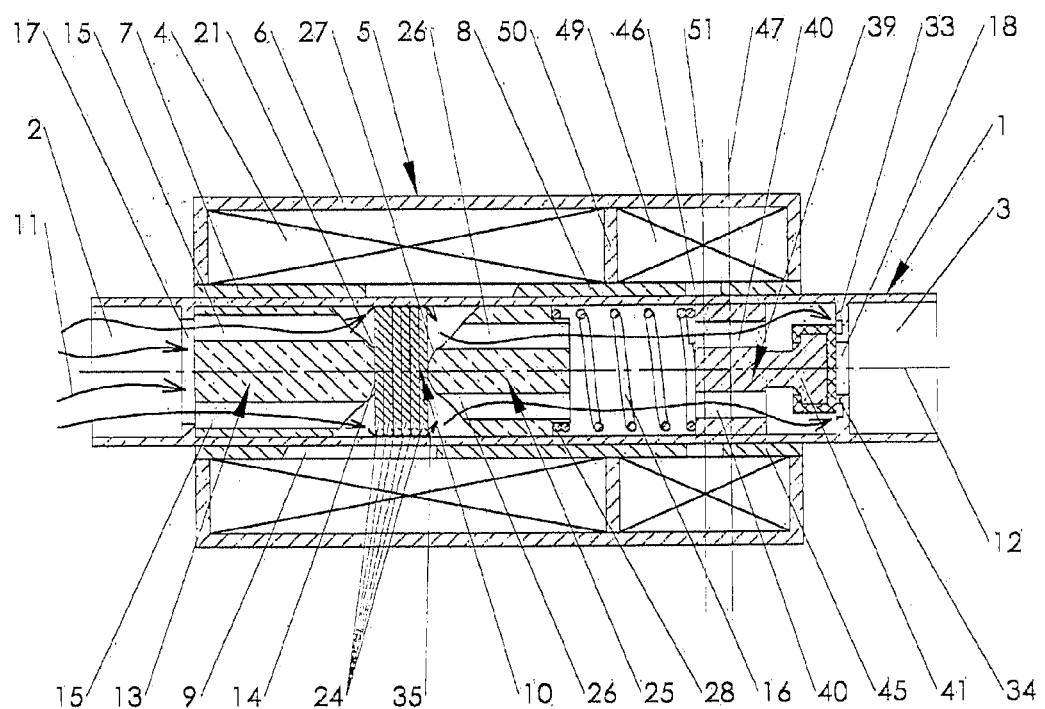
FIG. 23 shows a cross-sectional view of an alternative embodiment of the valve of the present invention similar to the valve of FIG. 20 but with an additional electromagnetic coil.

Using a separate coil 49 (FIGS. 23 through 25), to activate the magnetic member 39 and open or close the outlet 3, gives a flexibility in coil design and operating power of the valve's coils, but introduces an extra output of the controlling valve electronics system. To separate magnetic fields of two coils the cage 6 has a transversal member 50 of the ferrous lamination 5 assembled between two coils and surrounds the bush 8 of the lamination. This bush 8 becomes magnetically separated by the transversal member 50 between two coils. Its left part, which has the angularly truncated end, is disposed within the coil 4 and the right part of the bush 8 is exposed within the coil 49. In the closed position of the valve, wherein the magnetic member 39 with the protrusion 41 and the sealing member 33 is pressed by the spring 16 towards the outlet 3 and blocks it, magnetic centre 47 of the magnetic member 39 is offset from the magnetic Centre 51 of the coil 49, which is formed by the bushes 8 and 45.

Figure 24:
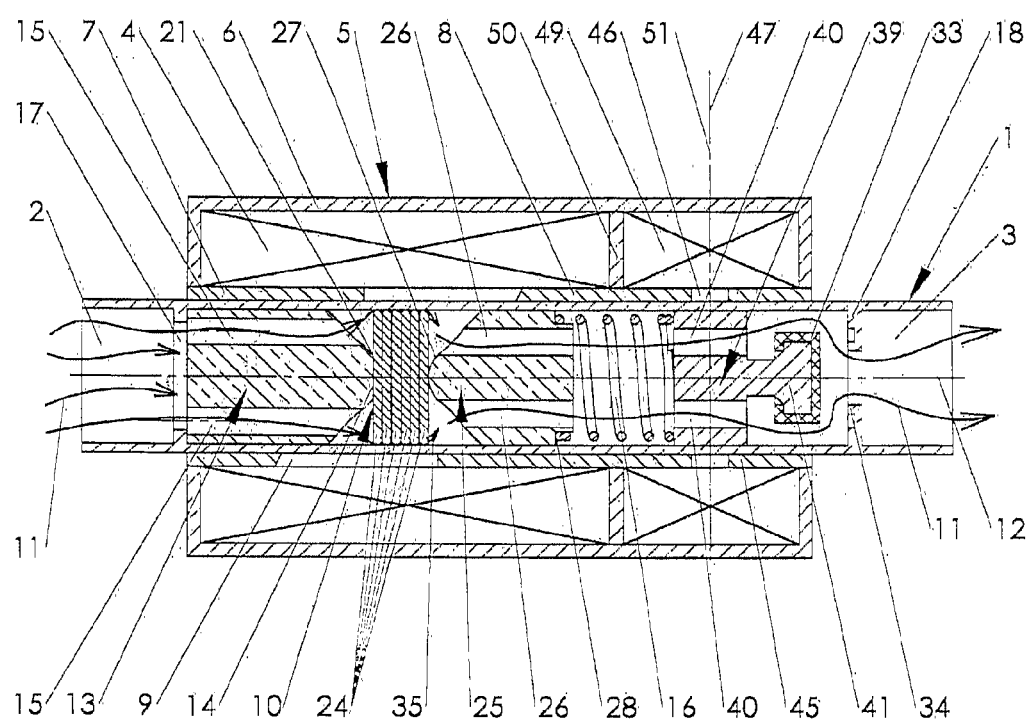
FIG. 24 shows a cross-sectional view of the valve of FIG. 23 in the initial opened position.
Figure 25:
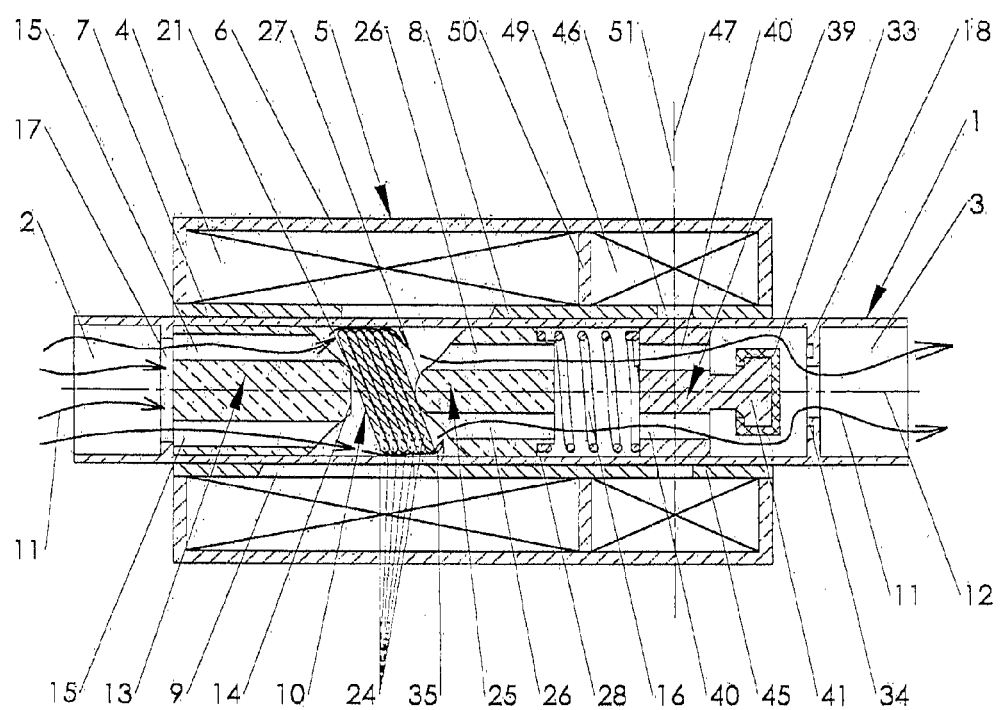
FIG. 25 shows a cross-sectional view of the valve of FIG. 23 in an opened but the initial position.
Figure 26:
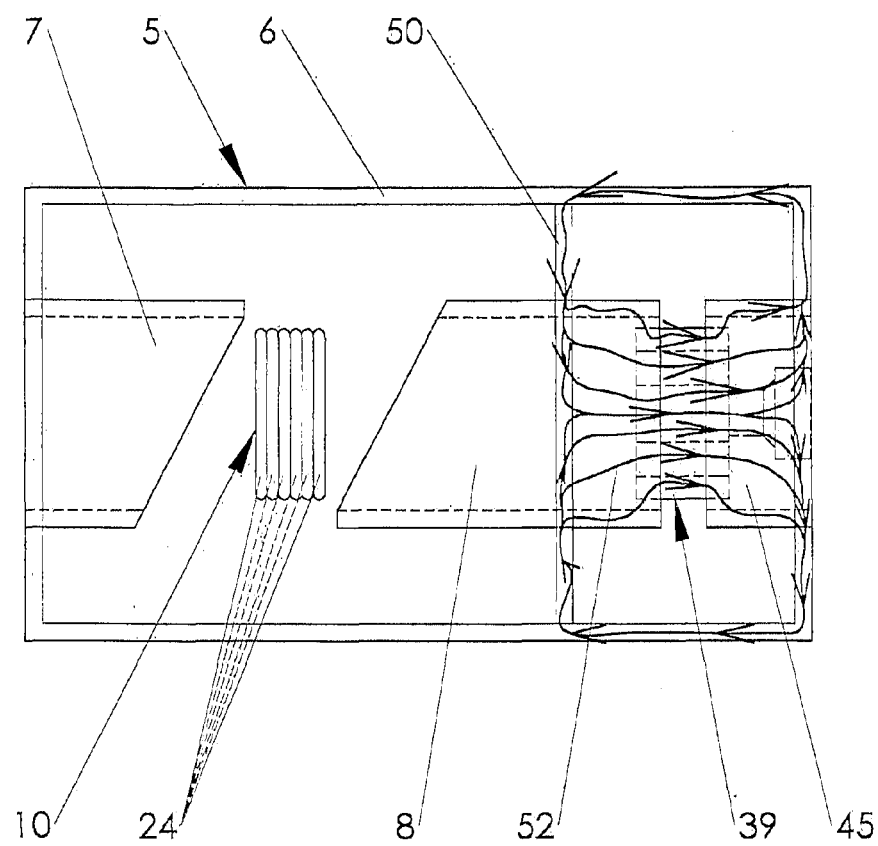
FIG. 26 shows a side view of the magnetic circuit of the valve of FIG. 24 and magnetic flux in the circuit.

When the valve is to be opened, coil 49 is energised and pulls the magnetic member 39 towards the gap 46 allowing the magnetic member 39 with the protrusion 41 to open the outlet 3. In case of a presence of the bypass leakage 35 its flow exits through the outlet 3 and serves as a first stage of the valve output (FIG. 24). Magnetic flux 52, induced by the coil 49, is shown in FIG. 26.

Figure 27:
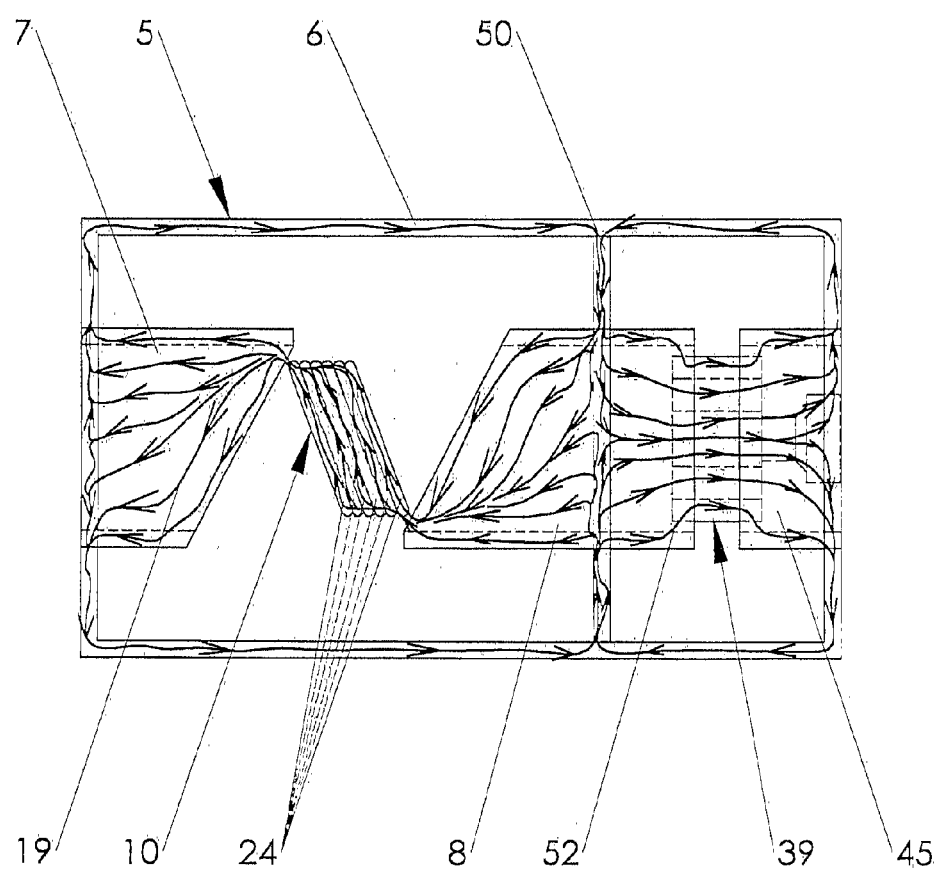
FIG. 27 shows a side view of the magnetic circuit of the valve of FIG. 25 and magnetic flux in the circuit.

Further increase in fluid flow through the valve is achieved by energising the coil 4 (FIG. 25) when magnetic flux 19 (FIG. 27), induced by the coil 4, analogously to all previous embodiments, creates a torque turning the occluder 10 end exposing an opening to the fluid flow.

Figure 28:
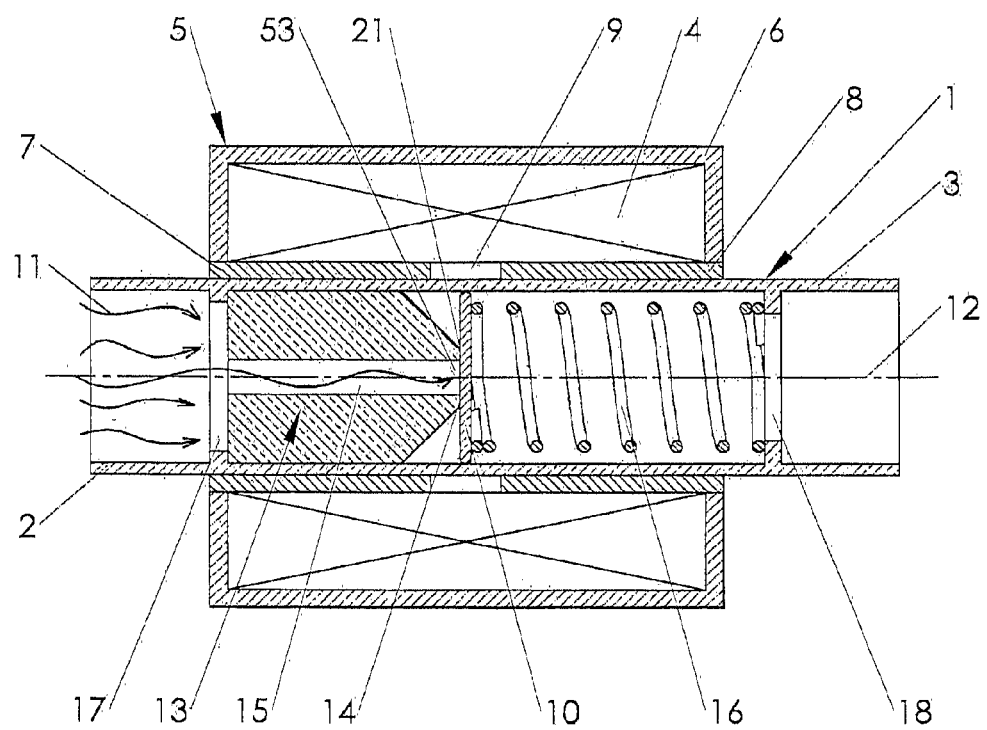
FIG. 28 shows a cross-sectional view of an alternative embodiment of the valve of the present invention in the fully closed position and with the occluder blocking a passageway through the supporting member.
Figure 29:
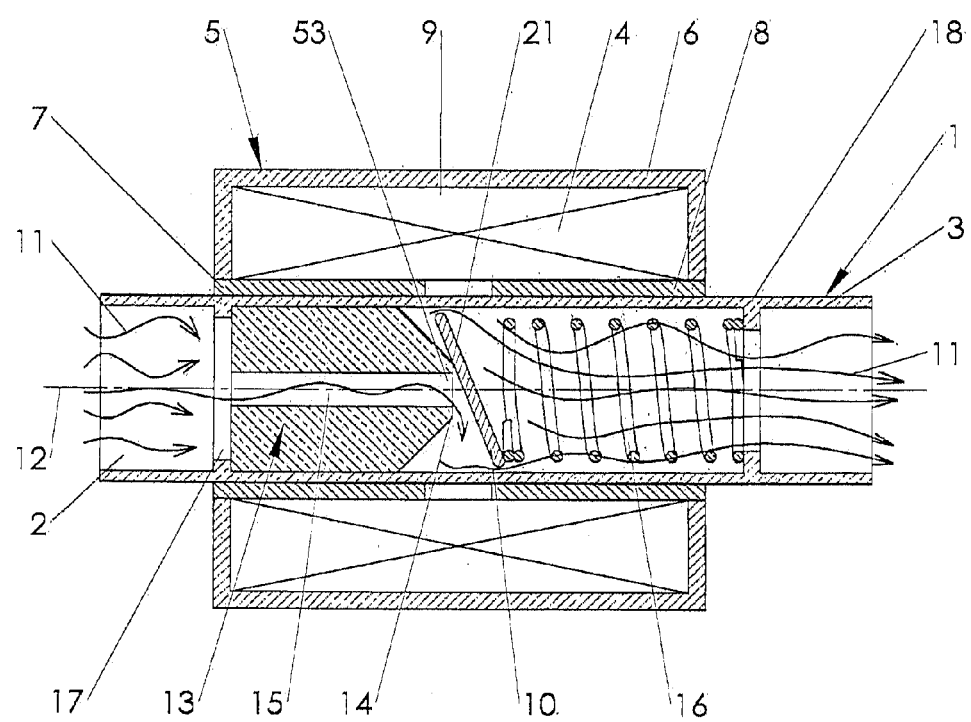
FIG. 29 shows a cross-sectional view of the valve of FIG. 28 in an opened position.

The purpose of the following embodiment is to simplify design of the valve with shut-off end flow adjustment capabilities. In this embodiment, shown in FIGS. 28 and 29, the supporting member 13 adjacent to the inlet 2, having an exit 53 of the passageway 15 through its flat tip 14. The exit 53 is blocked by the occluder 10 when the valve is in the closed position (FIG. 28) and when said valve is opened (FIG. 29) the occluder 10 is metering the flow through the exit 53 and conformably through the outlet 3. To prevent any bypass leak around the supporting member 13, its outer surface hermetically sealed against the inner surface of the tubular member 1. And to prevent a leakage through the exit 53 in the closed position of the valve a sealing gasket (not shown) is inserted between the flat tip 14 of the supporting member 13 and the occluder 10.

Figure 8:
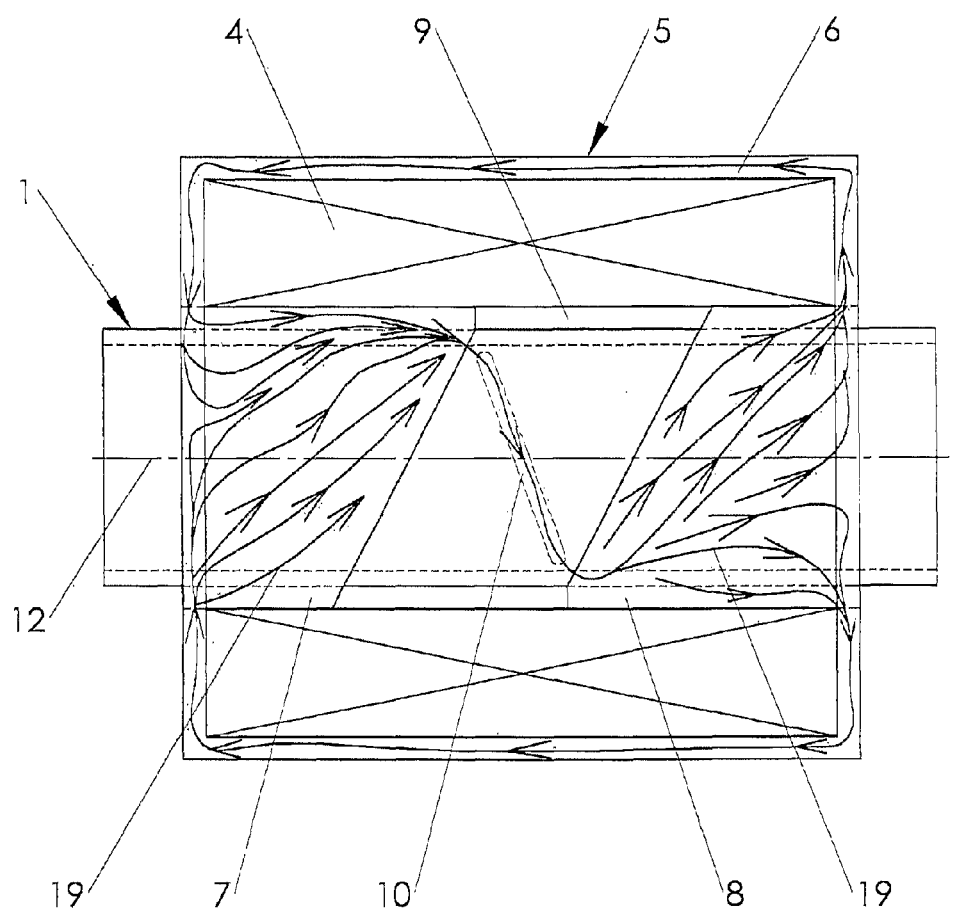
FIG. 8 shows a side view of the magnetic circuit of the valve with the truncated bushes of the lamination and magnetic flux in the circuit.
Figure 30:
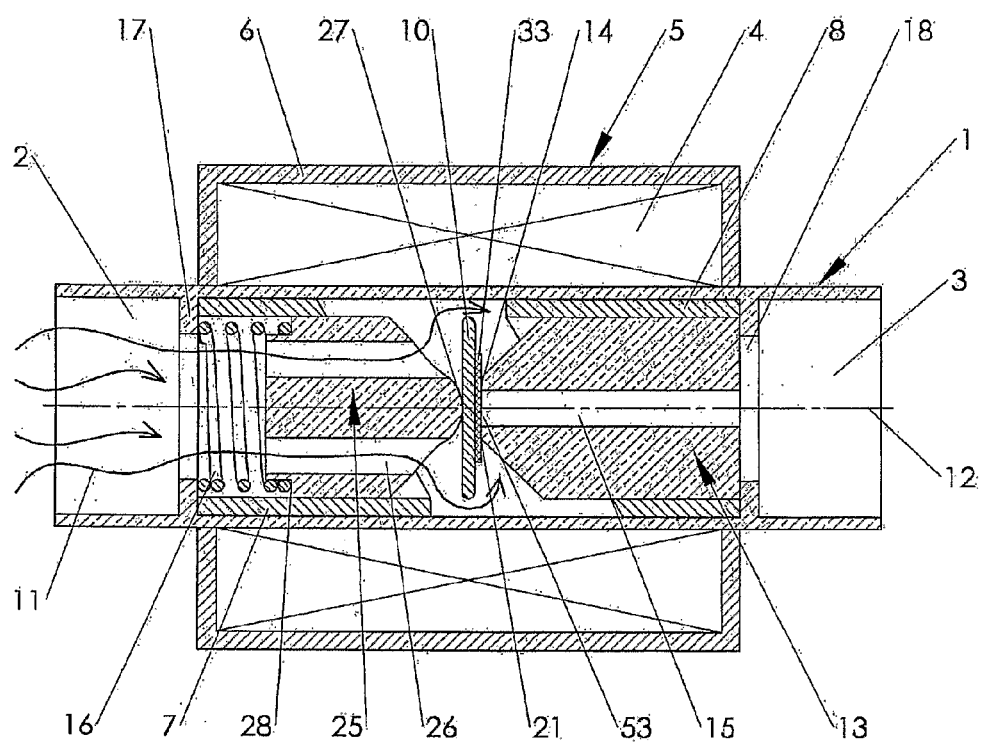
FIG. 30 shows a cross-sectional view of an alternative embodiment of valve of the present invention in the fully closed position and with the bushes of the lamination exposed inside the tubular member, two nonmagnetic supporting elements and a sealing member.
Figure 31:
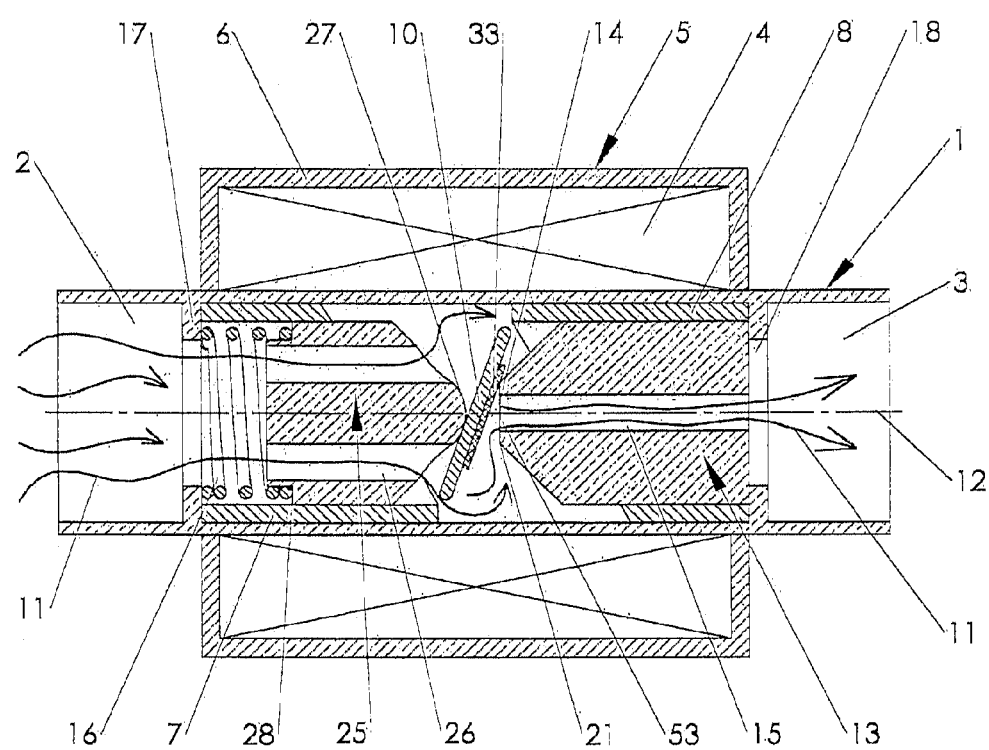
FIG. 31 shows a cross-sectional view of the valve of FIG. 30 in an opened position.

To reduce electric energy consumption by the valve and to increase its efficiency, it requires to increase density of the magnetic flux through the occluder 10 and to reduce the flux dissipation. One of the solutions is implemented in the following embodiment of the present invention illustrated in FIGS. 30 and 31. In this embodiment the bushes 7 and 8 of the lamination 5 are disposed within the tubular member 1 and reducing the nonmagnetic gap between them and the occluder 10. Both supporting members 13 and 25 are made of a nonmagnetic material. Similar to the previous embodiment, shown in FIGS. 28 and 29, the supporting element 13 has an exit 53 of the passageway 15 through its flat tip 14 and occluder 10 occludes or allows the fluid flow 11 through the exit 53 accordingly to the value of electric current in the coil 4. To prevent a leakage through the exit 53 in the closed position of the valve a sealing gasket 33 is inserted between the flat tip 14 of the supporting member 13 and the occluder 10. FIG. 30 shows the closed position of the valve and FIG. 31—an opened position. When the coil 4 is energized, the distribution of the magnetic flux 19 in the magnetic circuit of the valve is similar to one, which is shown in FIG. 8.

Figure 32:
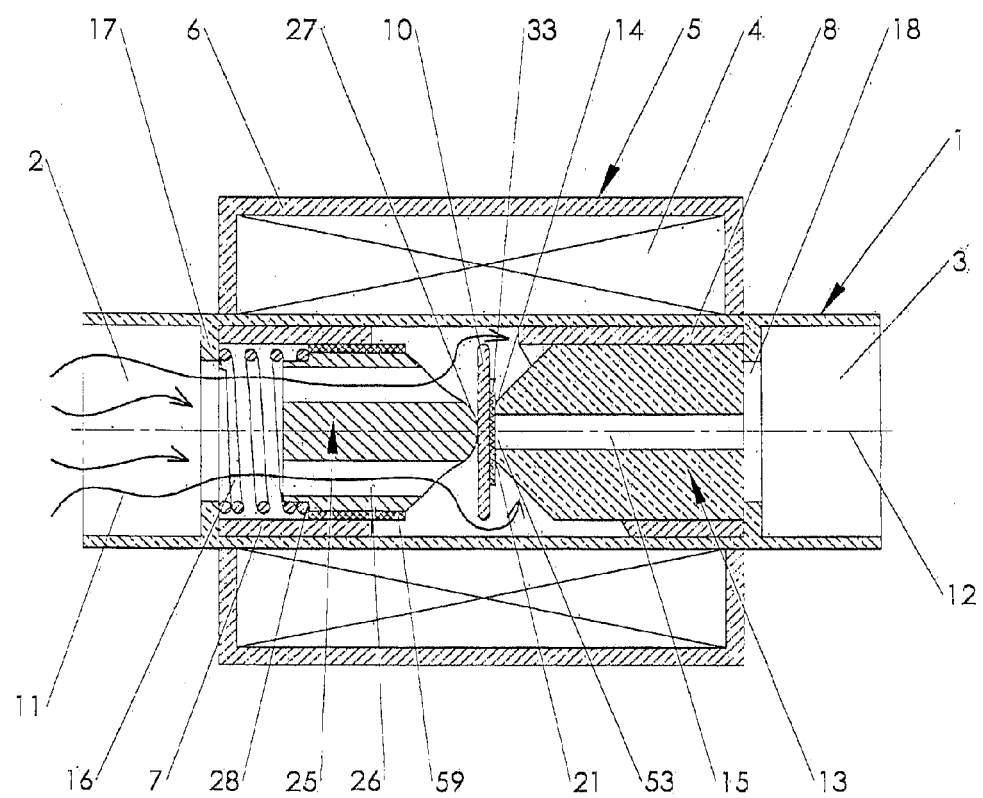
FIG. 32 shows a cross-sectional view of an alternative embodiment of the valve of the present invention in the fully closed position and similar to the previous embodiment shown in FIG. 30, but with the spring loaded supporting member of a magnetic material which is separated from the bush of the lamination by an anti-friction member.
Figure 33:
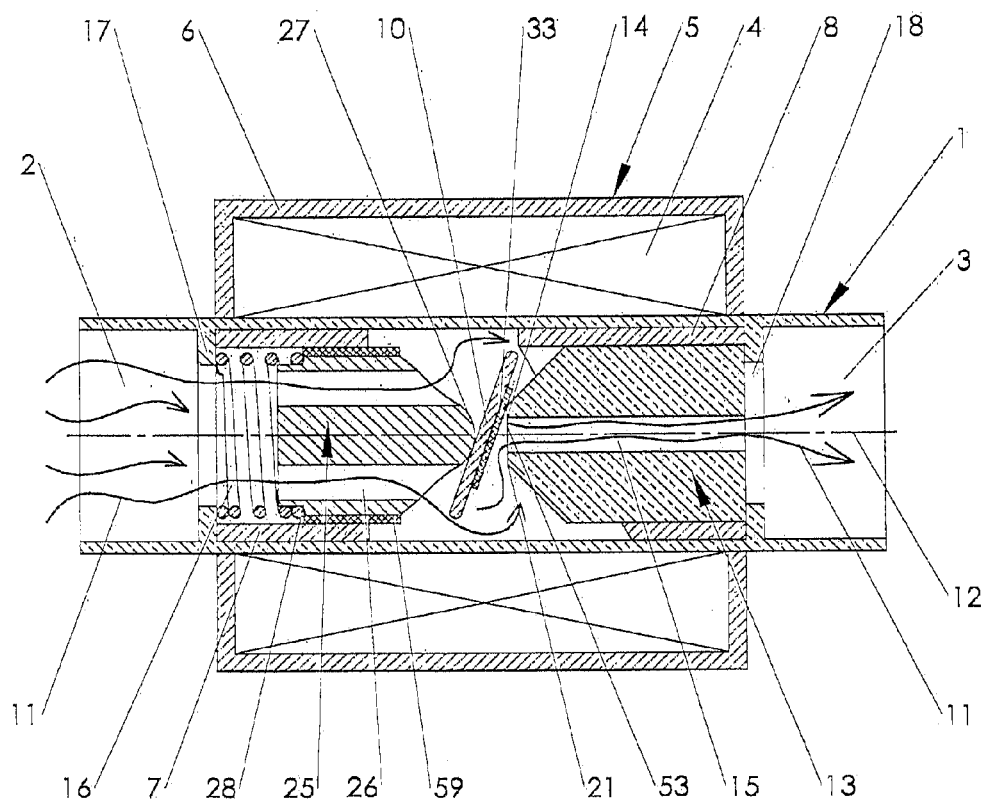
FIG. 33 shows a cross-sectional view of the valve of FIG. 32 in an opened position.
Figure 34:
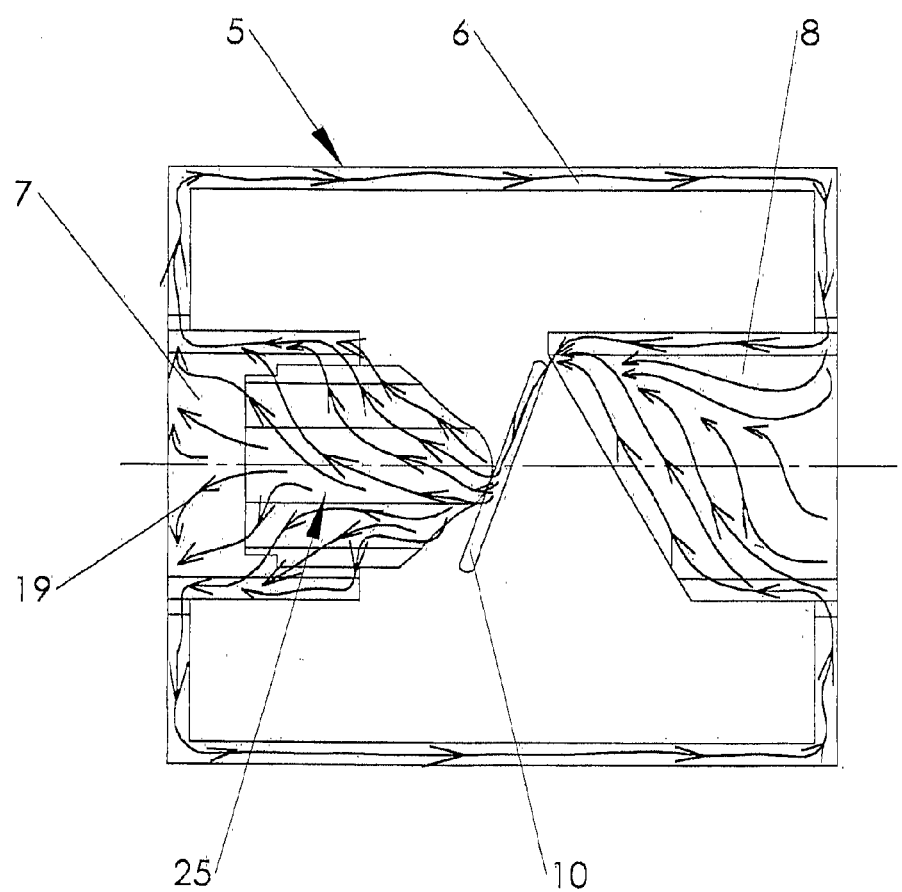
FIG. 34 shows a side view of the magnetic circuit of the valve of FIG. 33 and magnetic flux in the circuit.

Another embodiment of the present invention, shown in FIGS. 32 and 33, is also aimed to reduce nonmagnetic gap between the parts of the magnetic circuit. As distinct from the previous embodiment (FIGS. 30 and 31), in this embodiment the supporting member 25 of a magnetic material, is a part of the magnetic circuit of the valve and located inside the bush 7 with a possibility of an axial movement. For reducing friction between the member 25 and the bush 7 this embodiment includes an anti-friction member 59 exposed between the supporting member 25 and the bush 7. FIG. 32 shows the closed position of the valve and FIG. 33—an opened position. FIG. 34 shows magnetic flux 19 induced by the coil 4 (not shown) in the magnetic circuit of the valve of this embodiment.

Figure 35:
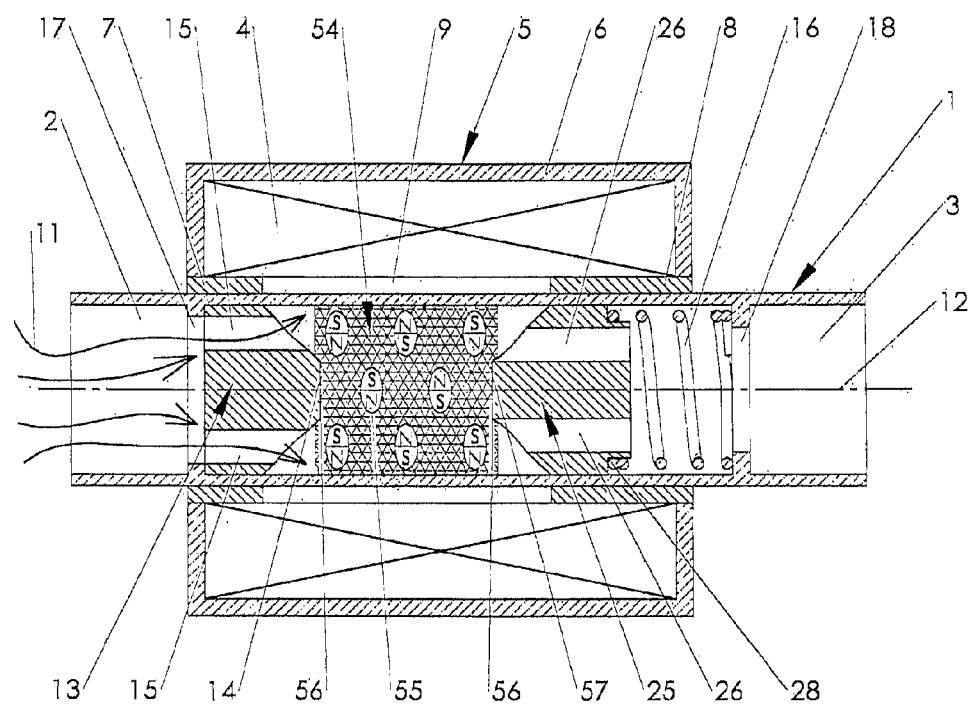
FIG. 35 shows a cross-sectional view of an alternative embodiment of the valve of the present invention in the fully closed position and with the occluder of a magnetostrictive material.
Figure 36:
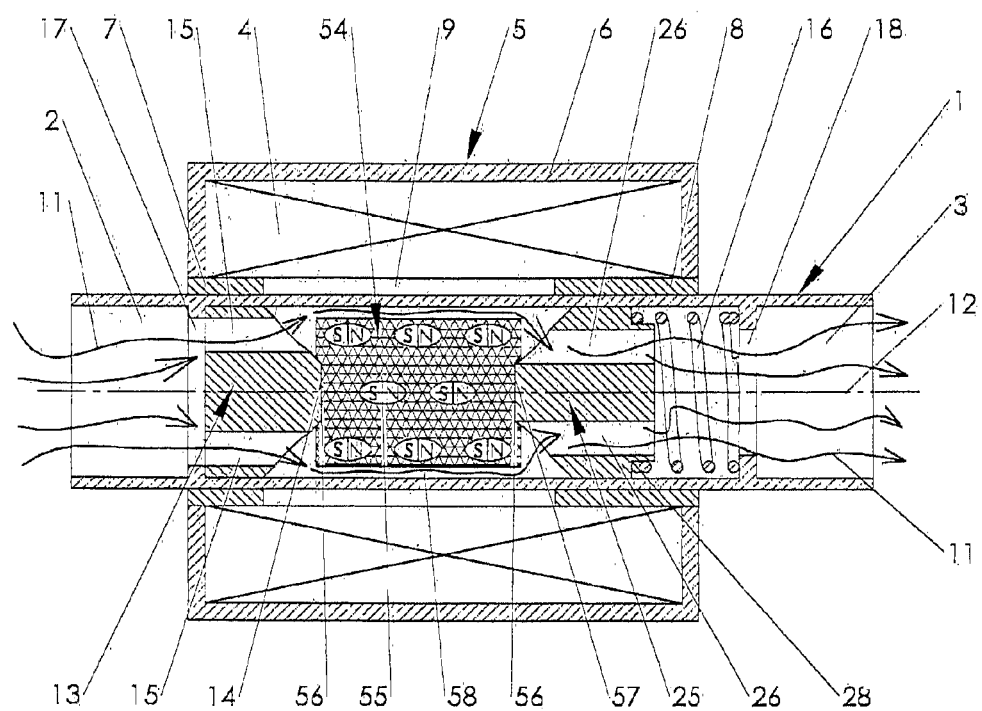
FIG. 36 shows a cross-sectional view of the valve of FIG. 36 in an opened position.

An alternative embodiment of the valve is shown in FIGS. 35 and 36. This embodiment, instead of the movable occluder 10, has an occluder 54 of a matter which is able to change its shape and (or) dimensions when exposed within a magnetic field. As an example, this matter can be a magnetostrictive material such as Terfenol-D, or an elastic material filled with magnetically polarised particles 55. In the preferred embodiment the occluder 54 is disposed within the tubular member 1 and located between two supporting members 13 and 25. Both supporting members 13 and 25 of a magnetic material and each of them has at least one passageway 15 and 26 accordingly, allowing fluid flow through. To centre the occluder 54 relatively to the longitudinal axis 12 of the tubular member 1, the occluder 54 has indents 56 on its end surfaces for the tips 14 and 57 of the supporting members 13 and 25. Adjacent to the spring 16 end of the supporting member 25 has the seat 28 for the spring 16. The occluder 54 is pressed between the supporting members 13 and 25 by a biasing means 16, such as spring and locked in place between two inner locking members (left 17 and right 18) rigidly mounted within the tubular member 1, in similar manner as in previous embodiments.

Figure 37:
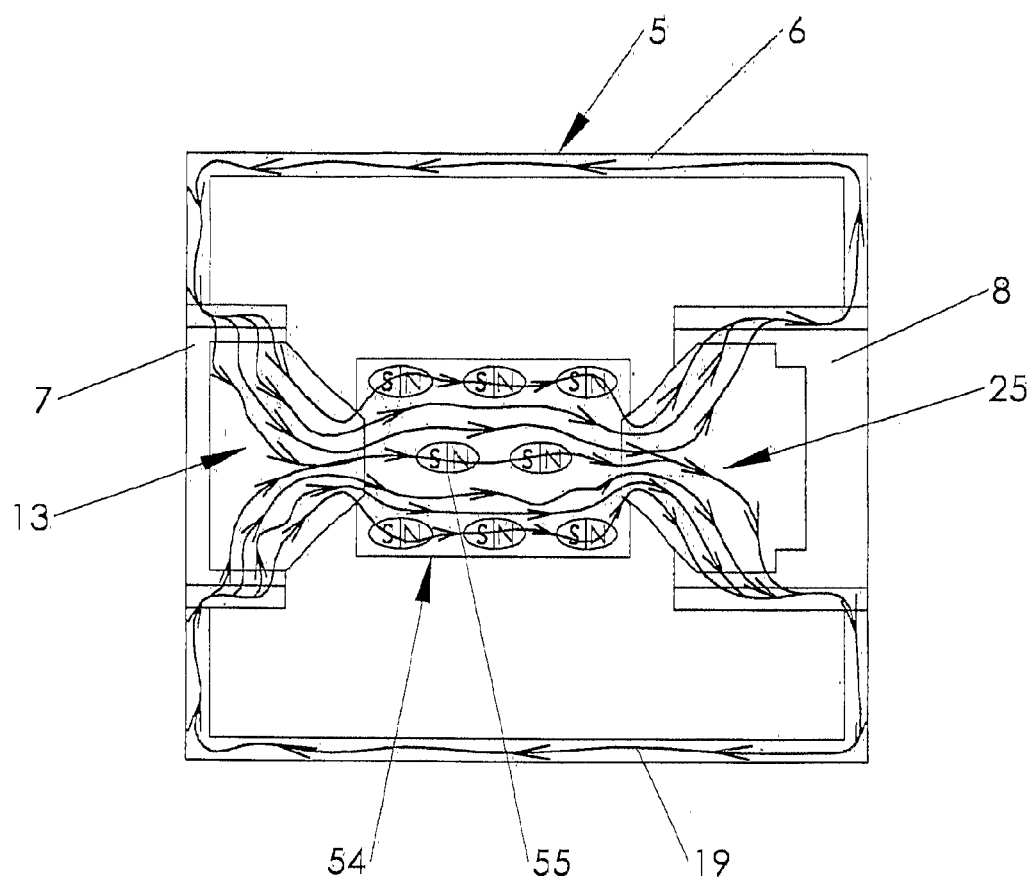
FIG. 37 shows a side view of the magnetic circuit of the valve of FIG. 36 and magnetic flux in the circuit.

When the valve is closed (FIG. 35) the occluder 54 has its original (out of magnetic field) dimensions and is expanded in radial directions towards inner surface of the tubular member 1 and blocks fluid flow through the valve. In an open position (FIG. 36) wherein the magnetic flux 19 (not shown), induced by the energised coil 4, runs through the occluder 54 and its magnetically polarised particles 55 and rotates them, causing change in the occluder's dimensions: the occluder's length expands in the axial direction (along the longitudinal axis 12 of the tubular member 1); and the diameter shrinks in the radial direction. The reduction of the occluder's diameter opens a passageway 58 allowing fluid flow through the valve. And similar to all previous embodiments the magnetic forces, exerted influence on the occluder, are increased or decreased with changes in the electric current in the coil, and this changes the cross-sectional area of the flow path. And FIG. 37 illustrates a path of magnetic flux 19 through the core 5, supporting members 13 and 25 and occluder 54 of the preferred embodiment when the valve is opened.

To compensate manufacturing inaccuracy and expand the valve capability to perform a broad-range flow control at different pressures and fluids' parameters such as viscosity and density, the mechanical pressure, created by the biasing means 16 and 36 and the axial position of the occluder 10 between the lamination poles (for example, bushes 7 and 8) are needed to be adjustable. This can be achieved by adjustable axial positions of the locking members 17 and 18. A simple example of such adjustment can be a screw fit (not shown in FIGS.) of at least one of the locking members.

Figure 38:
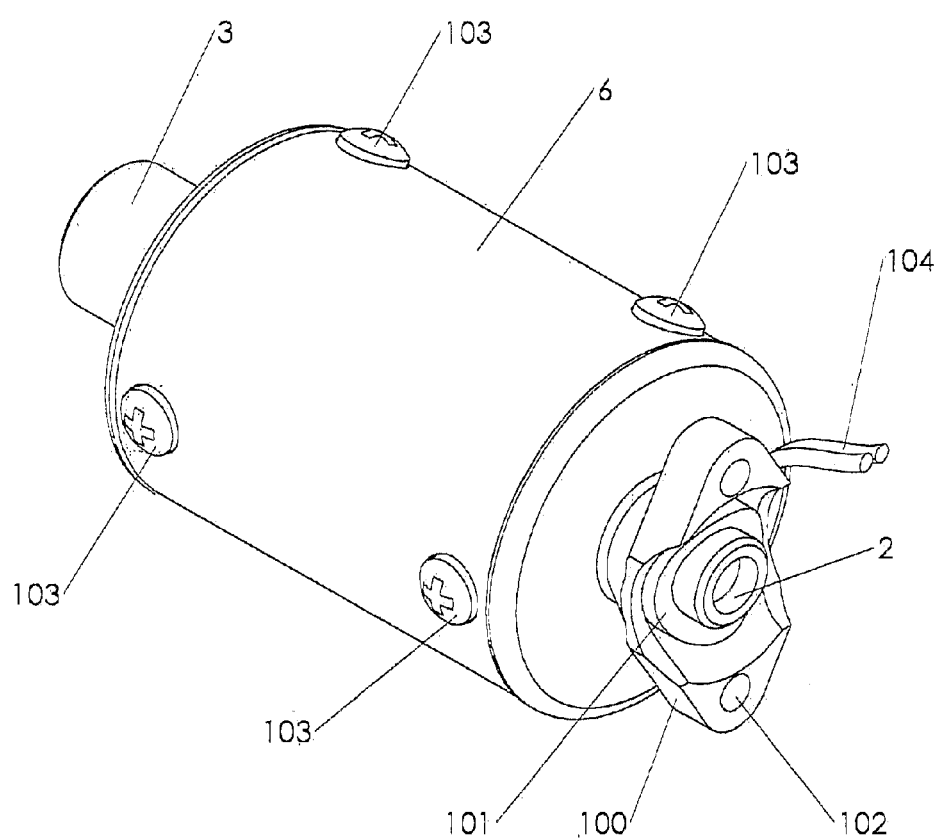
FIG. 38 shows an isometric view of a valve according to another embodiment of the present invention.
Figure 39:
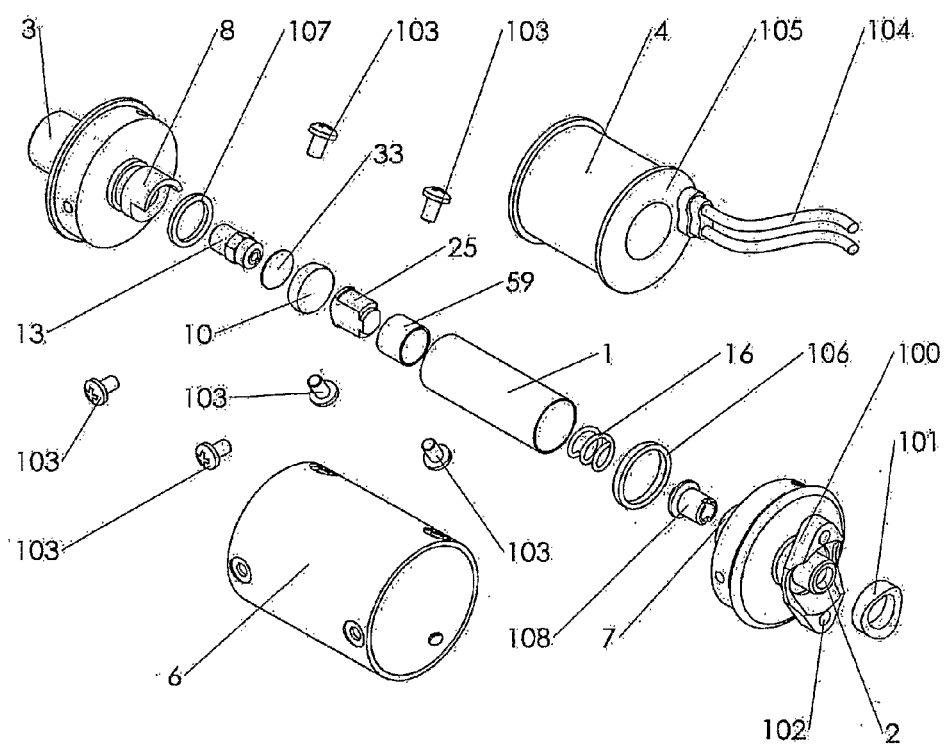
FIG. 39 shows an isometric exploded view of the valve of FIG. 38.
Figure 40:
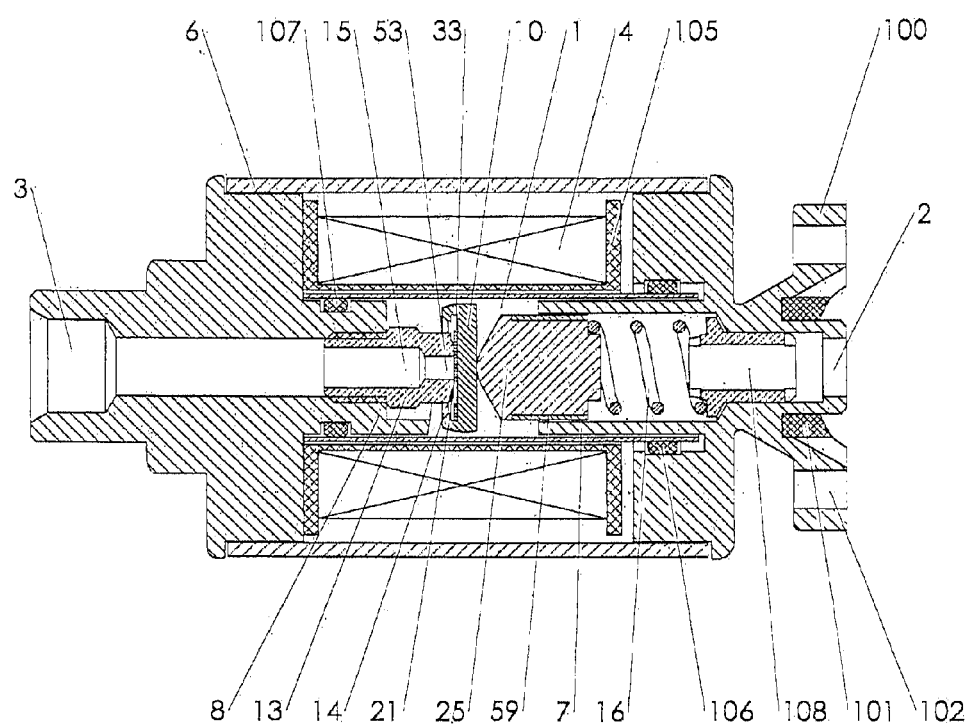
FIG. 40 shows a cross sectional view of the valve of FIG. 38.

FIGS. 38-40 show a working prototype of the adjustable electromagnetic fluid flow control valve where items not shown before are: an inlet fitting 100—a common feature for different types of gas valves, used to secure the valve on a tube or a manifold delivering gas; an inlet rubber seal 101 preventing fluid leakage to atmosphere by bypassing the joint between the delivering gas tuba and the valve inlet; holes 102 for fitting screws; screws 103 holding valve assembly together; leads 104 from the coil 4 to connect the coil winding to the power supply; a bobbin 105 for the winding of the coil 4; sealing o-rings 106 and 107 are used to prevent any fluid leakage between the internal part of the tubular member 1 and atmosphere. Type of material of the sealing members 33, 101, 106 and 107 depends on the type of the fluid metered by the valve. Instead of locking member 17 (FIG. 30) this embodiment comprises an adjustable screw-type locking member 108, which has a slot for screwdriver to be able to be turned and moved along the longitudinal axis 12 of the valve (FIG. 40).

Figure 41:
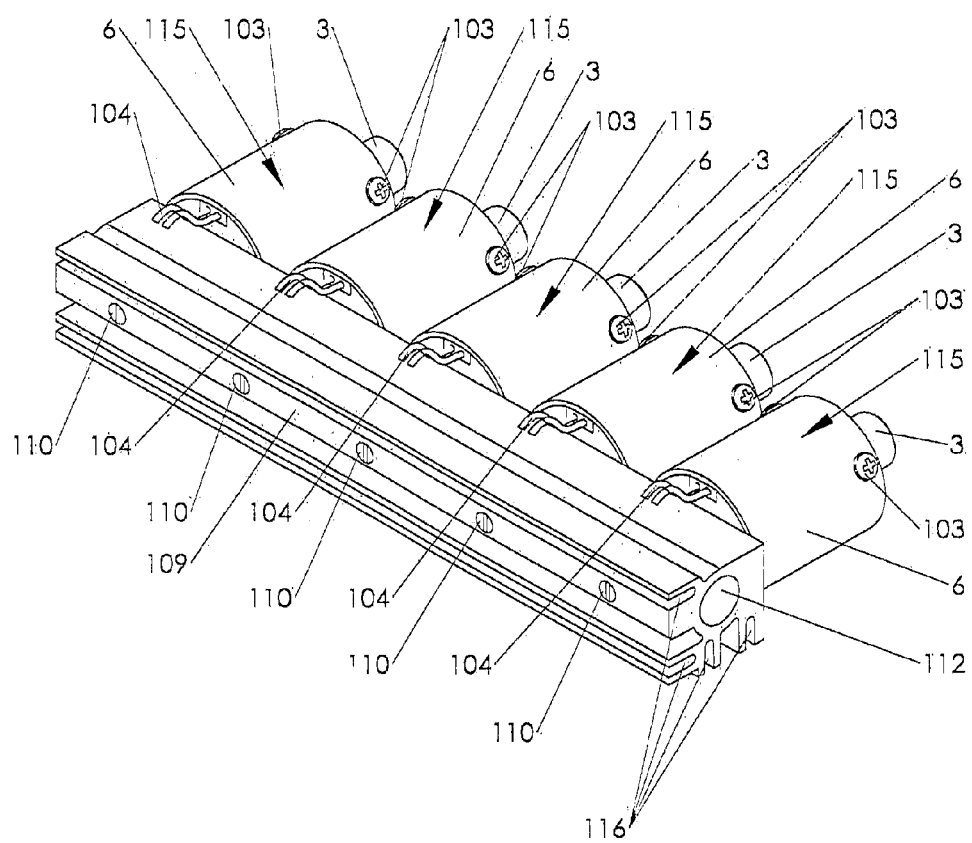
FIG. 41 shows an isometric view of five valves according to the embodiment of FIG. 38 having one common housing.
Figure 42:
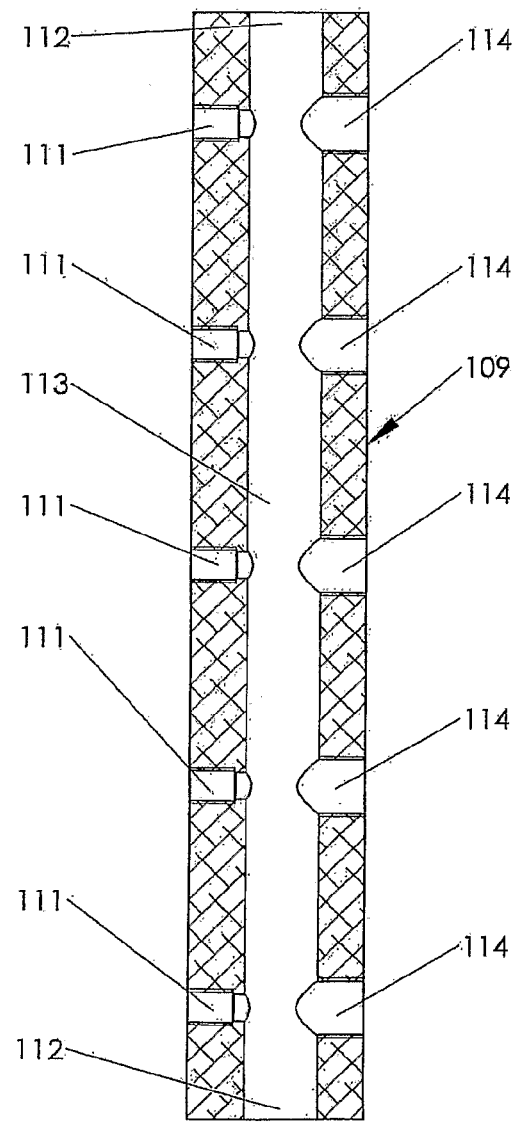
FIG. 42 shows a cross sectional view of the common housing for five valves of FIG. 41.

Another embodiment of the working prototype illustrated in FIG. 41 consists of five valves sharing a common housing 109 shown in FIG. 42. In this design the screws 110 are hermetically blocking holes 111 (FIG. 42), which are needed for adjusting positions of the locking members 108 (not shown on FIG. 41). Any of the ports 112 of the connection cavity 113 (FIG. 42) can be used as an inlet while the opposite port 112 can be blocked or used for a connection, for example, to another valve or manifold. Drilled and then threaded holes 114 are used for connecting the cavity 113 with the inlets of the valves 115. The apertures 116 are slots for mounting screws. The slots are intended to assist in the mounting of the device to any intended appliance.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are dawned to be incorporated herein as if individually set forth.

All references, including publications, patent applications, and patents, cited herein are hereby incorporated by reference to the same extent as if each reference Were individually and specifically indicated to be incorporated by reference and were set forth in its entirety herein.

The use of the terms, "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited, herein. All methods described herein can be performed in any suitable order unless otherwise indicated herein or otherwise clearly contradicted by context. The use of any and all examples, or exemplary language (e.g., "such as") provided herein, is intended merely to better Ruminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An adjustable electromagnetic fluid flow control valve, comprising: a tubular member of non-magnetic material; one end of said tubular member is forming an inlet and the opposite end of said tubular member is forming an outlet; at least one annularly configured electromagnetic coil which is surrounded from outside and partially from inside by a core of ferrous laminations; an inner part of said core consists of at least two mutually spaced bushes; said bushes of the inner part of said core are disposed within said tubular member; the end of at least one of said mutually spaced bushes which faces the other mutually spaced bush is cut across the length of said bush and a straight line which connects the end points of the profile of the cut is not perpendicular to a longitudinal axis of said tubular member; said coil has leads that are connected to a power supply and can be energised by said power supply under control of a controller; at least one occluder of a magnetic material, said occluder is disposed within said tubular member, a cross-section area of said occluder which faces the fluid flow is less than an inner cross-section area of said tubular member; said occluder cooperates with said electromagnetic coil and varies the flow volume permitted through the valve when said coil is energised; a supporting member having a narrowed end with a flat tip which faces said occluder and at least one passageway allowing fluid flow through, said supporting member is located within said bush of said inner part of said core and its flat tip is contiguous to said occluder; a sealing gasket is inserted between said flat tip of said supporting member and said occluder; said at least one passageway of said supporting member has an exit through said flat tip; said exit is blocked by said occluder when said valve is closed; when said valve is opened said occluder is metering fluid flow through said exit and conformably through said valve; at least one biasing means pressing said occluder against said flat tip of said supporting member; an additional supporting member separating said occluder and said biasing means and having at least one passageway allowing fluid flow through; said additional supporting member having an end with a round tip, which surface is tangential to an adjacent surface of said occluder; two locking members rigidly mounted within said tubular member providing a predetermined axial location of the opposite to said occluder ends of said first supporting member and said biasing means; the axial position of at least one of said locking members is adjustable.

2. The adjustable electromagnetic fluid flow control valve of claim 1, wherein at least any one of said supporting members is of a non-magnetic material.

* * * * *